US009510387B2

(12) United States Patent
Vesterinen et al.

(10) Patent No.: US 9,510,387 B2
(45) Date of Patent: Nov. 29, 2016

(54) RECOVERING CONNECTION IN LTE LOCAL AREA NETWORK FOR EPS AND LOCAL SERVICES

(75) Inventors: Seppo Ilmari Vesterinen, Oulunsalo (FI); Haitao Li, Beijing (CN); Yang Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 66 days.

(21) Appl. No.: 14/396,036

(22) PCT Filed: May 4, 2012

(86) PCT No.: PCT/CN2012/075088
§ 371 (c)(1),
(2), (4) Date: Oct. 21, 2014

(87) PCT Pub. No.: WO2013/163814
PCT Pub. Date: Nov. 7, 2013

(65) Prior Publication Data
US 2015/0063091 A1    Mar. 5, 2015

(51) Int. Cl.
*H04W 36/00* (2009.01)
*H04W 76/02* (2009.01)
*H04W 8/02* (2009.01)
*H04W 24/04* (2009.01)
*H04W 84/12* (2009.01)

(52) U.S. Cl.
CPC ............ *H04W 76/027* (2013.01); *H04W 8/02* (2013.01); *H04W 24/04* (2013.01); *H04W 76/028* (2013.01); *H04W 84/12* (2013.01)

(58) Field of Classification Search
CPC ... H04W 76/027; H04W 8/02; H04W 24/04; H04W 76/028; H04W 84/12
See application file for complete search history.

(56) References Cited

U.S. PATENT DOCUMENTS

| 2010/0002883 A1* | 1/2010 | Sammour | H04L 63/1416 380/272 |
| 2010/0195621 A1* | 8/2010 | Kekki | H04W 48/17 370/332 |
| 2011/0268085 A1* | 11/2011 | Barany | H04W 36/0033 370/331 |
| 2011/0294508 A1* | 12/2011 | Min | H04W 36/0083 455/436 |

(Continued)

FOREIGN PATENT DOCUMENTS

| CN | 101500279 | 8/2009 |
| CN | 101827428 | 9/2010 |
| WO | 2013/123643 A1 | 8/2013 |

OTHER PUBLICATIONS

International Search Report and Written Opinion received for corresponding Patent Cooperation Treaty Application No. PCT/CN2012/075088 , mailed Feb. 7, 2013, 12 pages.

(Continued)

*Primary Examiner* — Phuc Tran
(74) *Attorney, Agent, or Firm* — Mintz Levin Cohn Ferris Glovsky and Popeo, P.C.

(57) ABSTRACT

A method is disclosed, comprising sending a local connection re-establishment request to a local access apparatus in response to a failure of a radio link by which a user equipment was connected to a local network and operated in a single radio mode to use bearer services provided by a macro network; and recovering local signalling radio bearer in response to successfully verifying, by the local access apparatus, local context of the user equipment.

20 Claims, 17 Drawing Sheets

(56) References Cited

U.S. PATENT DOCUMENTS

| | | | |
|---|---|---|---|
| 2014/0370897 A1* | 12/2014 | Vesterinen | H04W 36/08 455/436 |
| 2015/0055620 A1* | 2/2015 | Vesterinen | H04W 36/18 370/331 |
| 2015/0063091 A1* | 3/2015 | Vesterinen | H04W 76/028 370/216 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331, v10.4.0, Dec. 2011, pp. 1-296.

Lin, "Introduction to Long-term Evolution-( LTE)", Mobile Communications Networking, 2011, 61 pages.

* cited by examiner

RECOVERING CONNECTION IN LTE LOCAL AREA NETWORK FOR EPS AND LOCAL SERVICES

RELATED APPLICATION

This application was originally filed as PCT Application No. PCT/CN2012/075088 filed May 4, 2012.

FIELD OF THE INVENTION

The exemplary and non-limiting embodiments of this invention relate generally to wireless communication networks, and more particularly to connection recovery in LTE local area networks (LTE-LAN) for both offloaded EPS service and local IP service with two RRC entities.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Along with the development of an LTE system, high-speed data service is one of the most important requirements. Especially for local area networks (LAN), higher data rate may be expected from a user's perspective. How to provide local service with high speed data rate has become a hot topic in 3GPP.

SUMMARY OF THE INVENTION

In current 3GPP specifications for LTE system, most mobility procedures are designed for EPS service in one RRC model and LTE security verification is usually involved in these procedures. For example, in RRC re-establishment request message, UE indicates C-RNTI, PCI and short MAC-I information to the eNB for context verification, and this short MAC-I is calculated based on LTE security keys. However, with the newly introduction of LTE-LAN, local IP service with no EPC control has been enabled by LTE-LAN radio technique. The outstanding features of this local IP service different from conventional EPS service may lie in its separate data path and independent security mechanism.

To enable both local service and EPS service with different network control manners, LTE-LAN system needs to involve two RRC entities, one located in the LTE-LAN AP for local connection management and the other located in the associated eNB for EPS connection management. By following existing RRC re-establishment procedure, only indicating EPS related UE identifiers in connection re-establishment request may not help to recover local service, which may cause bad user experience. Also existing mechanism is not applicable to the complicated two RRC case with different interworking options. This invention proposes some solution to solve this issue.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, and a computer program product as defined in the independent claims. Further embodiments of the invention are disclosed in the dependent claims.

An aspect of the invention relates to a method comprising, in response to a failure of a radio link by which a user equipment was connected to a local network and operated in a single radio mode to use bearer services provided by a macro network, sending a local connection re-establishment request to a local access apparatus; and in response to local context of the user equipment being successfully verified by the local access apparatus, recovering local signalling radio bearer.

A further aspect of the invention relates to a method comprising, in response to a failure of a radio link by which a user equipment was connected to a local network and operated in a single radio mode to use bearer services provided by a macro network, sending a local service request from the user equipment to a local access apparatus; and recovering local signalling radio bearer.

A still further aspect of the invention relates to a method comprising receiving, at a local access apparatus, a local connection re-establishment request from a user equipment that was connected to a local network and operated in a single radio mode to use bearer services provided by a macro network; verifying local context of the user equipment; and facilitating the user equipment to recover local signalling radio bearer.

A still further aspect of the invention relates to an apparatus comprising at least one processor; and at least one memory including a computer programme code, wherein the at least one memory and the computer program code are configured to, with the at least one processor, cause the apparatus to: in response to a failure of a radio link by which the apparatus was connected to a local network and operated in a single radio mode to use bearer services provided by a macro network, send a local connection re-establishment request to a local access apparatus; and in response to local context of the apparatus being successfully verified by the local access apparatus, recover local signalling radio bearer.

A still further aspect of the invention relates to an apparatus comprising at least one processor; and at least one memory including a computer programme code, wherein the at least one memory and the computer program code are configured to, with the at least one processor, cause the apparatus to: in response to a failure of a radio link by which the apparatus was connected to a local network and operated in a single radio mode to use bearer services provided by a macro network, send a local service request to a local access apparatus; and recover local signalling radio bearer.

A still further aspect of the invention relates to an apparatus comprising at least one processor; and at least one memory including a computer programme code, wherein the at least one memory and the computer program code are configured to, with the at least one processor, cause the apparatus to: receive a local connection re-establishment request from a user equipment that was connected to a local network and operated in a single radio mode to use bearer services provided by a macro network; verify local context of the user equipment; and facilitate the user equipment to recover local signalling radio bearer.

A still further aspect of the invention relates to a computer program product comprising program code means adapted to perform any of the above method steps when the program is run on a computer.

BRIEF DESCRIPTION OF THE DRAWINGS

In the following the invention will be described in greater detail by means of embodiments with reference to the attached drawings, in which.

DETAILED DESCRIPTION OF EMBODIMENTS

Figure 1:
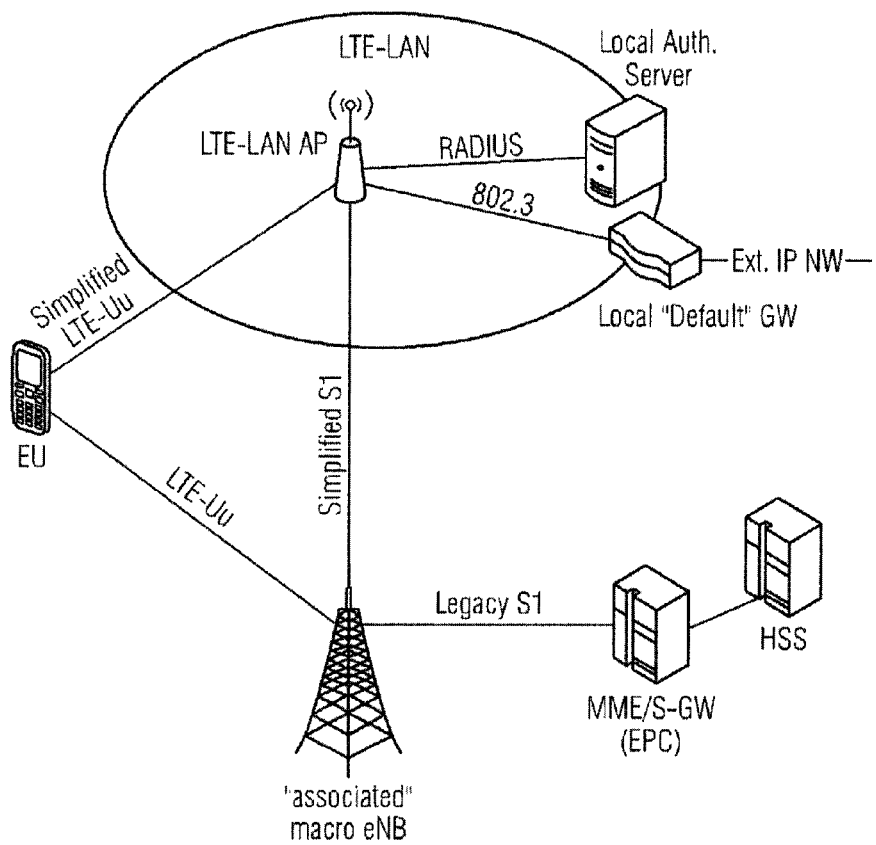
FIG. 1 illustrates an LTE-LAN network architecture according to an embodiment.

Local area evolution (LAE) aims to design a local area system providing high performance on peak data rate, cell capacity, QoS guarantee, interference management, etc. Low cost and high energy efficiency are also expected for the LAE system. In the LAE system, a support node (SN) concept is introduced. The support node (SN) refers to a network element located in a core network, providing some support/control/maintenance functionalities to the LAE system. A base station (BS) is located in the RAN side which provides the local area network, just like HeNB in the LTE system. UE maintains two connections with macro-eNB and LAE-BS, which are called "dual radio connections". A macro network connection is more stable and more carefully managed so that UE does not easily lose its connection, while a LAE connection is there more like for providing high speed data service in the local area.

LTE-LAN may be considered to compete with Wi-Fi technique. LTE-LAN is basically assumed to be based on LTE technology but is more focused on certain local area use cases and scenarios, and it has much similarity with the LAE concept. LTE-LAN is expected to provide high performance service for users, with low cost, and is expected to become a competitor to Wi-Fi. Since LAE and LTE-LAN both have the same requirements and features, the achievements on LAE may be transferred to the development of LTE-LAN.

A promising local area concept is an architecture based on the LTE-LAN and LAE concept which may also be referred to as a LTE-Hi concept. Basic assumptions in this concept include: 1) dual band operation, where local and wide area accesses are using different radios; and 2) autonomous (local area) operation to a mobile core network enabling LTE-LAN local access services deployment and operation either by a mobile operator or a local access network operator (third party), where the usage of LTE-LAN network locally supported services may be kept transparent to the core network for simplicity and for lightening signalling load exposed to the core network.

LTE-LAN (or LTE-Hi) higher level requirements may include potential requirements on architecture, such as cost-effectiveness and lower OPEX, enhanced traffic offloading other than LIPA for LTE femto (simpler solution), less CN (i.e. EPC or EPS) involvement with ICT friendly features, and new features enabled—D2D and a single/dual radio connection. Focused topics may include a cost effective LTE-Hi architecture—AP capability sharing, architecture support for new features—dual radio connection, an ICT friendly LTE-Hi architecture with less CN involvement, and enhanced flexible offloading of macro network services with LTE-Hi specific features. The requirement for less involvement of CN operation of a LTE-LAN network towards means that LTE-Hi local access control and session management functions like authentication, authorization and bearer management that normally are taken care by MME (EPC) are handled at EUTRAN and LTE-LAN level for accessing and using the LTE-LAN network and its resources in a flexible manner, e.g., by supporting dual radio connections.

In an HeNB sub-system, UE is in a single-radio mode all the time, i.e. if UE is handed over from a macro-eNB to use radio resources of HeNB, and if then a target HeNB takes the role of a serving eNB to UE requiring transfer of full eNB UE context data to HeNB and sharing security keys/data of the macro network. With a current 3GPP LTE architecture, on an AS layer, UE maintains only one RRC connection to E-UTRAN. On an NAS layer, in an ECM_CONNECTED state, UE maintains only one signalling connection to the core network (RRC connection+S1_MME connection). In the ECM_CONNECTED state, MME maintains only one eNB_ID for UE. In a CA case, this eNB_ID is to be derived for E-CGI of Pcell. In an ECM_IDLE state, MME only maintains one location information (TAI) for UE.

Carrier aggregation solutions have been studied in 3GPP, wherein a secondary radio path may be using the same RAT or I-RAT (e.g. LTE-HSPA CA and radio level dynamic flow switching between 3GPP and WLAN).

Also inter-site CA with LTE has been studied, wherein DL is transmitted via a macro-eNB (Pcell) and UL is transmitted via a pico cell (Scell). A common feature in CA solutions is that they are aggregating user traffic using multiple radio paths on the layers below layer-3 (at a radio link layer).

Even if LTE-Hi APs were comparable with Scells in the inter-site CA solutions (LTE-Hi APs are assumed to separate entities from eNBs located at different sites), the LTE-LAN architecture according to an embodiment is better in providing a flexible inter-working solution between a wide area (macro network) and LA (local area network) mobile broadband services in the spirit of an ITU IMT-A system.

An E-RAB offload feature supported by the LTE-LAN network architecture according to an embodiment is assumed to be working on the layer-3, i.e. it is not comparable with the above CA features at the radio link layer.

LTE carrier aggregation with standard UEs has been proposed regarding carrier aggregation at L3 (layer-3), by using two ordinary UEs coupled together (e.g. LTE modems connected to different USB ports in a laptop) and by combining two radio paths, i.e. "carriers" in a serving eNB. This kind of dual radio scenario, however, does not issue any specific network architecture.

An embodiment discloses a LTE-LAN network architecture that, depending on a deployment model, is capable of supporting a stand-alone mode for locally provided services without CN (i.e. EPC or EPS) involvement, and a flexible single/dual radio mode in control of E-UTRAN to offload macro LTE network resources to use LTE-LAN network resources on demand.

FIG. 1 illustrates the LTE-LAN network architecture with exemplary network entities and interfaces between these entities. LTE-LAN applies a new LTE-like radio interface that is shown in FIG. 1 as a "simplified LTE-Uu" interface. Due to the requirement of less CN involvement, the LTE-LAN network supports a "stand-alone" mode where the LTE-LAN network is working autonomously by providing a basic wireless broadband access with UE traffic routing to a local LAN/IP network directly from LTE-LAN AP and to the internet via a default GW of this local LAN/IP network. This autonomous "stand-alone" mode operation is useful especially in the cases where the overlaying macro network service coverage is missing or UE with a LTE-LAN radio has not obtained a subscription from the macro mobile network operator. The local LAN transport network may include an ordinary Ethernet-based LAN, i.e. IEEE 802.3, as shown in FIG. 1. In general this stand-alone LTE-LAN operation resembles existing Wi-Fi network solutions except that the radio interface is using said simplified LTE-Uu interface.

For an autonomous stand-alone mode operation the LTE-LAN network provides means for UE authentication and authorization to use services provided by the LTE-LAN network. This may be implemented by using similar methods as applied in WLAN (IEEE 802.11i) but modified to carry the authentication protocol messages, e.g., EAP encapsulated into LTE Uu RRC (radio resource control) messages. In FIG. 1, there is shown an optional local authentication server that may be a RADIUS server or a diameter server like the one used in enterprise Wi-Fi networks, also enabling support of UEs without a SIM-card, or without necessitating a subscription from a mobile network operator if needed.

UE with a LTE-LAN radio may not have a SIM-card or a subscription to macro network, so the LTE-LAN network should support using local user identifiers, instead of necessitating to reveal IMSI used in the macro network to LTE-LAN, and in general avoid sharing security keys/data of the macro network (E-UTRAN and EPC) with the LTE-LAN network. This separation of user identifiers and security context is required, as a LTE-LAN network may be considered as an untrusted access from a macro LTE network point of view. This "untrusting" applies to the cases where the LTE-LAN network is administered and operated by some party other than the mobile network operator but where the mobile network operator has an agreement with the LTE-LAN operator to use available LTE-LAN network resources for offloading the macro network.

UE requesting a LTE-LAN service may be identified and authorized locally in the LTE-LAN network, for example, by using:

a unique device HW identifier, such as a L2 address of a LAN interface IMEI,

ICCID (integrated circuit card ID) of the SIM card; unique UICC (SIM) card serial number; identifies a physical SIM card, not the SIM application stored into it, a temporary LTE-LAN identifier provided by LTE-LAN AP (this may be sufficient for open LTE-LAN access), LTE-LAN credentials (username/password, network access identifier (RFC 4282), secure ID etc.) maintained in case an optional local authentication server, e.g., RADIUS server, is provided in LTE-LAN, a second SIM-card to access LTE-LAN provided local services.

In an embodiment, for LTE-LAN provided services in the stand-alone mode LTE-LAN AP is allowed to configure, for an authorized UE, a radio bearer service with access to the LTE-LAN network and/or internet by using locally provisioned QoS rules, i.e. due to simplicity no information exchange towards the core network (EPC) is necessary like it is in a 3GPP LIPA feature for HeNBs.

An embodiment enables supporting a single/dual radio mode to offload macro LTE network resources to use LTE-LAN network resources, possibly operated by a third party, to a macro mobile network operator. An embodiment enables integrating the LTE-LAN network as an untrusted sub-system to E-UTRAN, the offloaded macro LTE network resources at the AS layer being in control of an associated macro-eNB, wherein a "simplified S1" application protocol (S1AP') interface is used for interworking as shown in FIG. 1. This S1-like interface may also support some X2 application protocol functions for radio resource control and mobility management purposes.

The associated macro-eNB is supposed to be the sole controller of the offloaded macro network resources/services when using the LTE-LAN sub-system resources. LTE-LAN supported local services which may run in parallel with these offloaded macro network services, may be handled as a LTE-LAN network internal issue (no CN involvement required), but on demand it may be possible to let the mobile operator to also control these LTE-LAN local services via the associated macro-eNB, i.e. decision about LTE-LAN local service establishments with local IP breakout from LTE-LAN AP is carried out optionally in, or via, the associated macro-eNB.

In order not to weaken security provided by the macro mobile network, an embodiment discloses that the associated macro-eNB stores eNB UE context data (provided by MME) as usual, resolves binding to the LTE-LAN UE context in LTE-LAN AP, and for the offloaded E-RAB services derives required LTE-LAN parameters (e.g. E-RABs) from eNB UE context parameters by using temporary user identifiers negotiated between the associated eNB, LTE-LAN AP and UE.

In the supported dual radio mode it is also assumed that the offloaded E-RABs (on the U-plane) and UE-to-eNB control signalling is passed transparently via the LTE-LAN sub-system. This secondary connection applies same e2e ciphering as used over a primary macro LTE radio connection, i.e. when UE communicates to the associated macro-eNB via the LTE-LAN sub-system (secondary connection), user data/control messages become secure-tunnelled and no sensitive information from the macro network is revealed to LTE-LAN AP. Thus, the LTE-LAN network may be operated by a mobile operator, in which case a LTE-LAN may be considered as a trusted access network. Thus, standardizing too many options in 3GPP may be avoided.

The same secure tunnelling via the LTE-LAN sub-system applies also for a possible single LTE-LAN radio case where a user/UE with a SIM-card is willing to consume EPC provided services without radio connectivity to the macro network. In an embodiment, the associated macro-eNB is in a role of the serving eNB towards EPC but each UE related service uses resources of the LTE-LAN sub-system. This may require that a LTE-LAN cell is exposed to EPC as one of the cells belonging to the associated macro-eNB (like HeNB GW exposes HeNBs to EPC), and the associated macro-eNB behaves towards EPC accordingly, e.g., as a result of a UE-triggered service request procedure there is created an eNB UE context based on which the associated macro-eNB configures bearer services to use the LTE-LAN network resources at the AS layer.

In order to let the associated macro-eNB to control its offloaded radio resources and mobility at the AS level towards LTE-LAN AP, it may be sufficient that RAN application protocol signalling between the associated macro-eNB and LTE-LAN AP is run over IPSec by using a security association between these nodes. The required security association (SA) between eNB and LTE-LAN AP may be established in advance, e.g., by using O&M.

Figure 2:
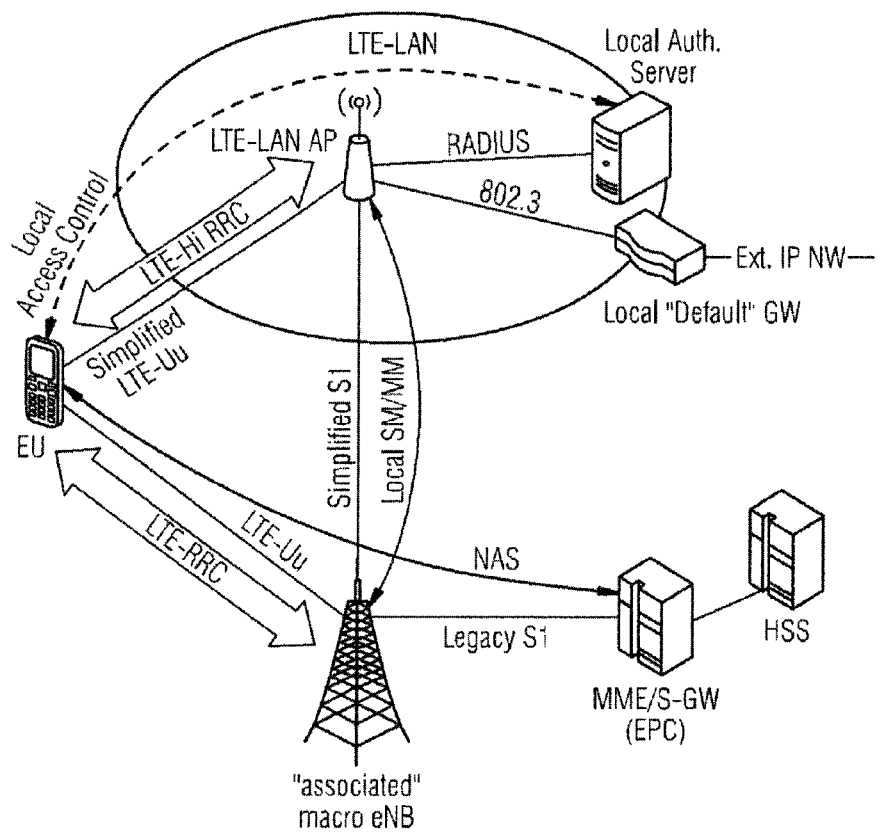
FIG. 2 illustrates control interfaces in a dual radio mode according to an embodiment.

FIG. 2 illustrates applied control interfaces in an LTE—LTE-LAN dual radio mode. The control interfaces in the LTE—LTE-LAN dual radio mode may be as follows:

UE has a NAS signalling connection to EPC via the serving macro-eNB by using LTE-RRC as usual, UE has RRM, bearer/mobility management towards the serving serving eNB as usual; this may be considered as a main RRC connection in the LTE-LAN dual radio mode, UE has a simultaneous LTE-LAN RRC connectivity to LTE-LAN AP providing 1) local access control signalling towards LTE-LAN, 2) local radio link management (RRM), 3) local bearer/mobility management signalling for LTE-LAN provided services, the associated macro-eNB has a local control interface ("simplified S1") towards the LTE-LAN sub-system, with following characteristics 1) the control for the offloaded macro network resources is handled in the associated macro-eNB transparently to EPC like the LTE-LAN resources were part of the macro-eNB resources, i.e. they are macro-eNB internal issues, 2) macro-eNB may emulate a local MME in the local E-RAB and mobility management while controlling the offloaded E-RAB services (L3 offloading) via LTE-LAN AP, 3) the macro-eNB may also be capable of controlling the LTE-LAN AP radio resources for multi-path radio connections at the link layer (L2) so that LTE-LAN AP is in a role of a RRC proxy; this enables developing new multi-radio features using multiple data paths, e.g., LTE—LTE-LAN carrier aggregation at RAN-level on demand.

The LTE-LAN network architecture according to an embodiment supports flexible offloading of macro network bearer services in control of the associated macro-eNB in order to use resources in the LTE-LAN sub-system either in the dual or single radio modes.

Figure 3:
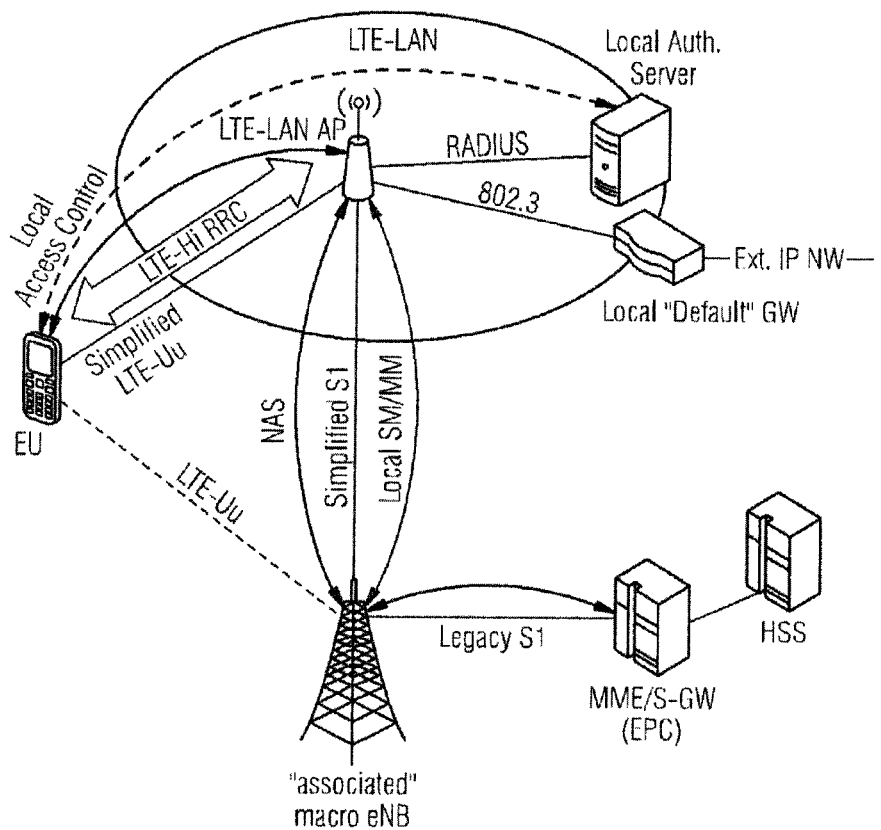
FIG. 3 illustrates control interfaces in a single radio mode according to an embodiment.

The scenario for a LTE-LAN single radio mode is as follows:

When UE with a SIM card and subscription to a macro network has established a radio link connectivity to LTE-LAN AP, but macro network coverage is not available, UE may request not only local LTE-LAN service(s) but also services consumed via EPC. FIG. 3 illustrates control interfaces in a LTE-LAN single radio mode supporting services consumed via the macro network. In this LTE-LAN single radio mode it is assumed that LTE-LAN AP and its neighboring macro-eNB have established a "simplified S1" connection in advance. This may be considered as a common signalling channel on the S1-MME interface.

Due to security reasons, upon service setup there may be created eNB UE context data stored in the associated macro-eNB, and the LTE-LAN sub-system maintains only the LTE-LAN UE context required derived from the eNB UE context for link layer resource management purposes. Now the LTE-LAN AP may relay ciphered UE-to-eNB and UE-to-MME (NAS) signalling messages transparently, i.e. there is created a secured tunnel from UE to the macro network via the LTE-LAN interfaces.

Again herein, as proposed in connection with the dual radio mode, the associated macro-eNB may apply AS-level RAN application protocol signalling towards LTE-LAN AP in order to configure the required LTE-LAN resources for the bearer services according to the eNB UE context that is the result of the UE negotiations with EPC at the NAS-level signalling.

Figure 4:
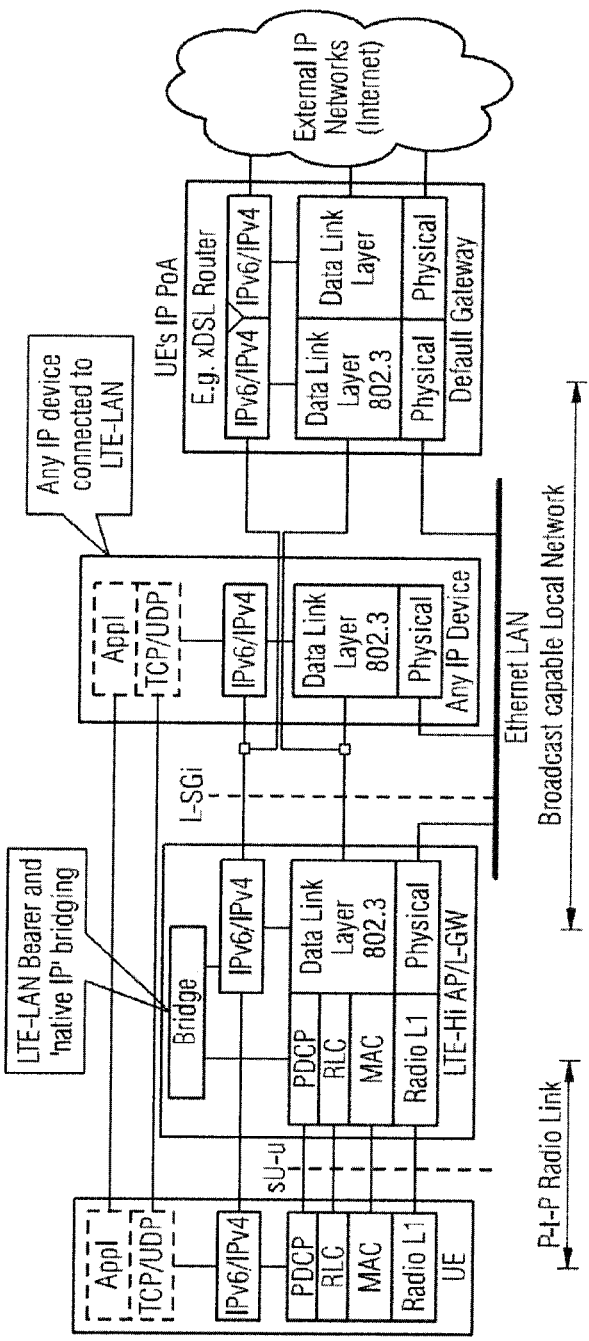
FIG. 4 illustrates a user plane protocol stack in a stand-alone operation mode according to an embodiment.

FIG. 4 illustrates an example of a U-plane protocol stack for LTE-LAN bearer services in the LTE-LAN network "stand-alone" operation mode (local IP breakout). LTE-Hi AP (or LTE-LAN AP) is able to provide a direct U-plane connectivity to the local packet switched network (e.g. LTE-LAN zone) via its co-located "P-GW like" local GW (L-GW) function. A simple bridging function between data radio bearer and "native IP" to Local LAN/IP network provides the required U-plane interface (L-SGi) for LTE-LAN bearer service traffic, i.e. S1 like U-plane tunnelling to an external L-GW as used in the current 3GPP LIPA feature, may be omitted (actually this bridging function is a lot like the one used in WLAN APs except that the radio interface is totally different). LTE-Hi AP only needs to know the UE IP address associated with the LTE-Hi E-RAB context in order to perform local routing/forwarding in the LTE-LAN service. There is no need to separate the L-GW control interface from EPC as the simple bridging function may be controlled just by using the "simplified S1" control interface from the associated macro-eNB.

Figure 5:
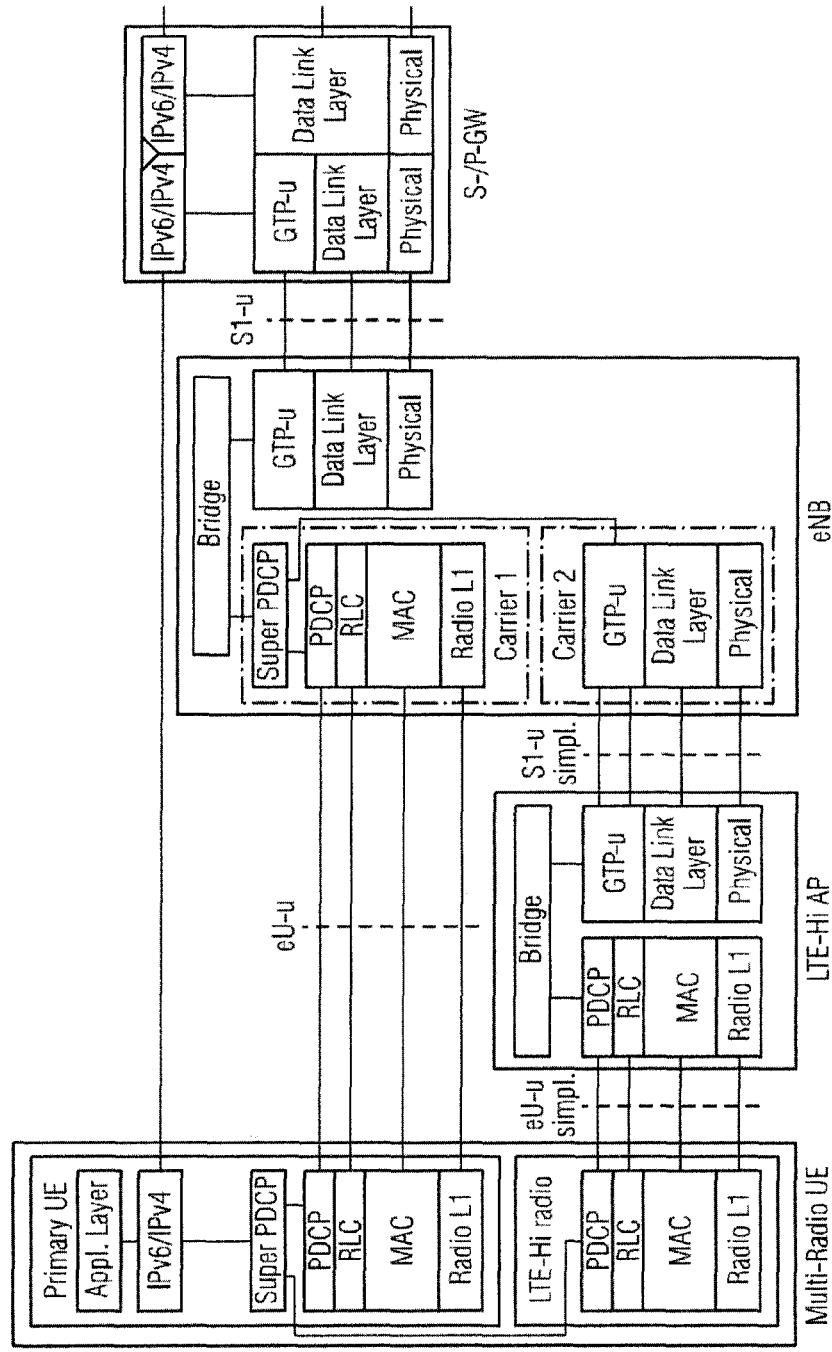
FIG. 5 illustrates a user plane protocol stack in a dual radio mode according to an embodiment.

FIG. 5 illustrates an example of a U-plane protocol stack for the LTE—LTE-LAN dual radio mode to offload LTE macro network bearer services via the LTE-LAN sub-system. A data path between UE and eNB via LTE-Hi AP is ciphered and possibly header compressed at an upper "super PDCP" layer, i.e. no security issues arise due to using the LTE-LAN resources as a secondary user traffic data path.

Figure 6:
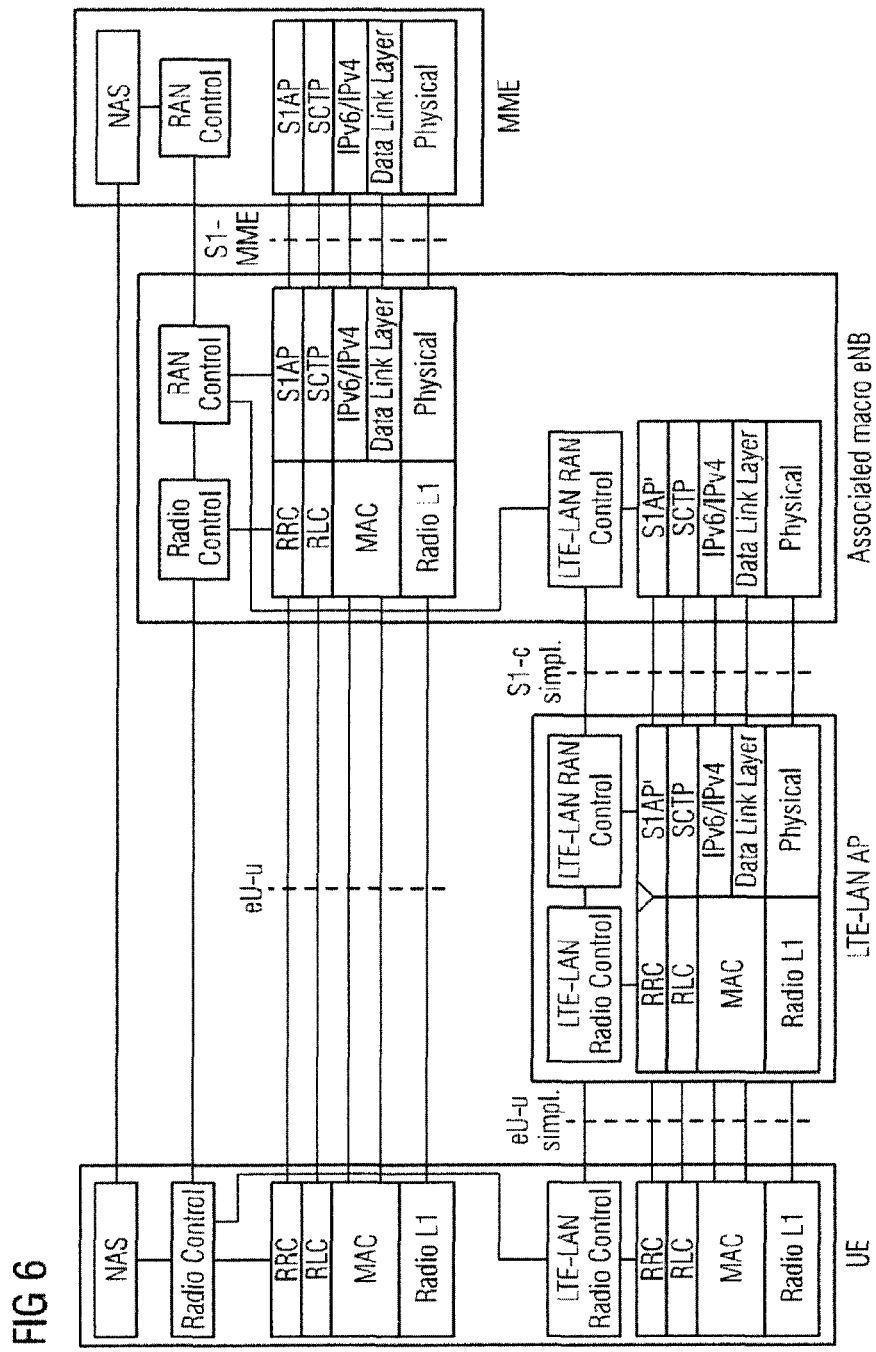
FIG. 6 illustrates a control plane protocol stack in a dual radio mode according to an embodiment.

FIG. 6 illustrates an example of a C-plane protocol stack for the LTE—LTE-LAN dual radio mode to offload LTE macro network bearer services via the LTE-LAN sub-system. A primary control interface between UE and the associated macro eNB is using a direct radio link connection (eU-c in FIG. 6) and works as usual except for supporting control of a secondary radio path. A secondary control interface for LTE-LAN radio path management (UE to LTE-LAN AP) works as an autonomous sub-system allowing the primary application layer control entities in UE and the associated eNB to use and configure its resources.

Figure 7:
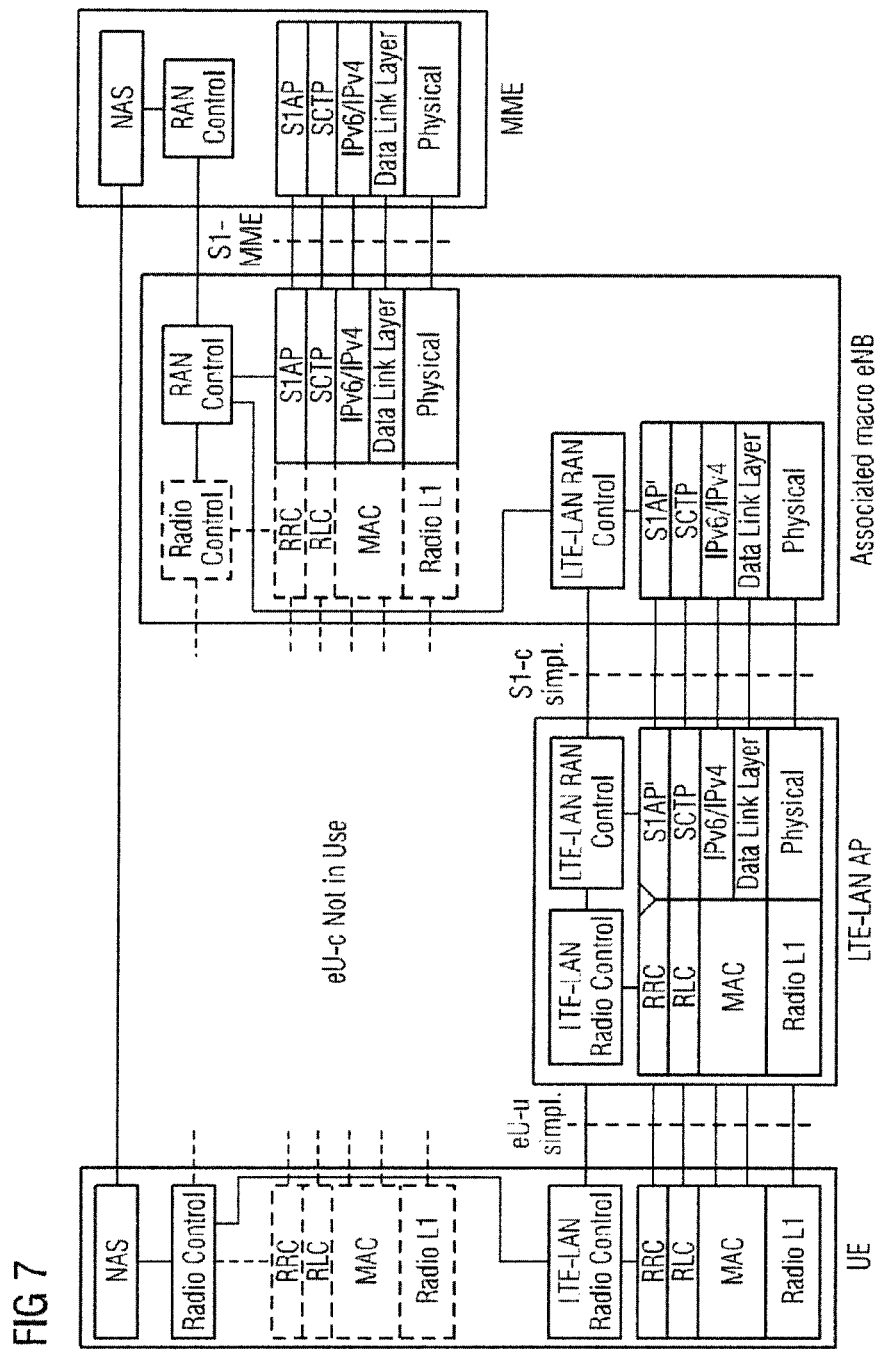
FIG. 7 illustrates a control plane protocol stack in a single radio mode according to an embodiment.

FIG. 7 illustrates an example of a C-plane protocol stack for the LTE-LAN single radio mode to offload LTE macro network bearer services via the LTE-LAN sub-system (i.e. to use services from the macro network). In the LTE-LAN single radio mode the e2e signalling between UE and the macro LTE network are passed transparently via the LTE-LAN sub-system in a similar manner as, e.g., NAS messages are passed from UE to MME encapsulated in ciphered NAS containers over RRC and S1AP. The associated macro-eNB is as an anchor to EPC and stores eNB UE context data as if UE were connected directly over the eU-c radio link connection (now in single radio mode not in use). An application layer "RAN control" entity in the associated macro-eNB now controls a "LTE-LAN RAN control" entity to let it create the required bearer services (i.e. "bit-pipes")

over the LTE-LAN sub-system to pass UE's EPS bearers consuming services provided by the mobile operator.

In an embodiment, no sensitive macro network related context is exposed to the LTE-LAN network but still the macro network is able to use the LTE-LAN network resources in control of the associated macro-eNB for offloading. An embodiment is applicable to various deployment models, i.e. it does not matter whether the LTE-LAN network is operated by the mobile operator or by a third party local operator. This may be a sole enabler for heterogeneous network deployments in the future. In an embodiment, legal interception works for offloaded EPS bearer services as usual and for the users with a SIM card also a binding between IMSI and local user identifiers used in the LTE-LAN network may be solved if desired. An embodiment has a lot in common with a proposed LTE—Wi-Fi carrier aggregation feature when seen from UE and eNB implementation and specification work point of view in 3GPP, i.e. applicability of these local area network and wide area network inter-working principles may be used together with any radio access technology in local area networks. In an embodiment, LTE-LAN AP takes care of a fast loop radio link control over the simplified Uu interface, enabling less stringent backhaul requirements for the "simplified S1" interface. By adopting an LTE like radio bearer/link model, a LTE-LAN may be made to support fair and intelligent resource sharing when multiple UEs are connected to the same AP. It should be noted that such a function is not possible, e.g., in WLAN due to its legacy burden.

Thus, a LTE-LAN architecture according to an embodiment supports single and dual radio modes in control of E-UTRAN. Core network transparent local radio access sub-system providing local area services (stand-alone) and E-RAB bearer service offload for multi-radio capable UEs in control of their serving macro-eNB (E-UTRAN node). The new LTE-LAN network architecture that depending on the deployment model is made capable of supporting a stand-alone mode for locally provided services without CN (i.e. EPC or EPS) involvement and a flexible single/dual radio mode in control of E-UTRAN to offload macro LTE network resources to use LTE-LAN network resources on demand.

Embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network node, server, corresponding component, and/or to any communication system or any combination of different communication systems that support a local radio access network sub-system. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE network elements, without restricting the embodiment to such an architecture, however. The embodiments described in these examples are not limited to the LTE radio systems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

Figure 8:
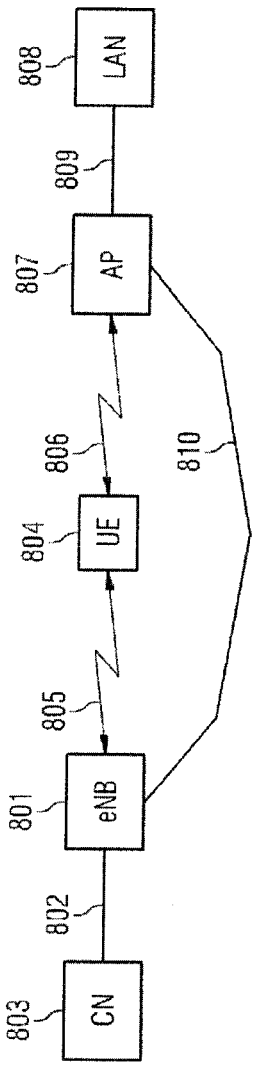
FIG. 8 shows a simplified block diagram illustrating exemplary system architecture.

A general architecture of a communication system is illustrated in FIG. 8. FIG. 8 is a simplified system architecture only showing some elements and functional entities, all being logical units whose implementation may differ from what is shown. The connections shown in FIG. 8 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

The exemplary radio system of FIG. 8 comprises a network node 801 of a network operator. The network node 801 may include, e.g., an LTE base station (eNB), radio network controller (RNC), or any other network element, or a combination of network elements. The network node 801 may be connected to one or more core network (CN) elements 803 (such as a mobile switching centre (MSC), MSC server (MSS), mobility management entity (MME), gateway GPRS support node (GGSN), serving GPRS support node (SGSN), home location register (HLR), home subscriber server (HSS), visitor location register (VLR)) via a connection 802 (also referred to as a legacy S1 interface). In FIG. 8, the radio network node 801 that may also be called eNB (enhanced node-B, evolved node-B) or macro network apparatus of the radio system, hosts the functions for radio resource management in a public land mobile network. FIG. 8 shows one or more user equipments 804 located in the service area of the radio network node 801. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smartphone, personal digital assistant (PDA), handset, laptop computer. In the example situation of FIG. 8, the user equipment 804 is capable of connecting to the radio network node 801 via a connection 805 (also referred to as a LTE-Uu interface). In the example situation of FIG. 8, the user equipment 804 is further capable of connecting to a local radio network node 807 via a connection 806 (also referred to as a simplified LTE-Uu interface). The local radio network node 807 may include, e.g., an LTE-LAN access point (AP), LTE-HI access point, or any other network element, or a combination of network elements. The network node 807 may be connected to one or more local network (LAN) elements 808 (such as a local authentication server, local gateway) via a connection 809 (e.g. RADIUS interface or IEEE 802.3 interface). The local network node 807 may be connected to the macro network node 801 via a connection 810 (also referred to as a "simplified S1" interface).

Figure 9:
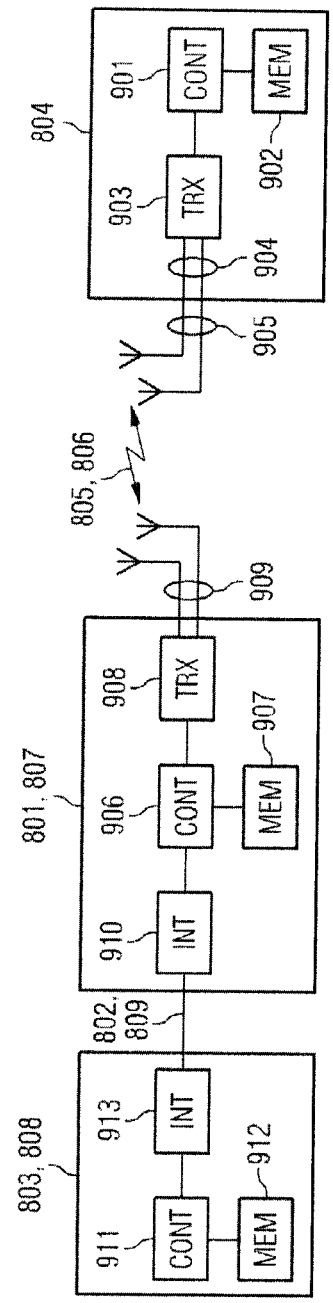
FIG. 9 shows a simplified block diagram illustrating exemplary apparatuses.

FIG. 9 is a block diagram of an apparatus according to an embodiment of the invention. FIG. 8 shows a user equipment 804 located in the area of a radio network node 801, 807. The user equipment 804 is configured to be in connection with the radio network node 801, 807. The user equipment or UE 804 comprises a controller 901 operationally connected to a memory 902 and a transceiver 903. The controller 901 controls the operation of the user equipment 804. The memory 902 is configured to store software and data. The transceiver 903 is configured to set up and maintain a wireless connection 805, 806 to the radio network node 801, 807. The transceiver is operationally connected to a set of antenna ports 904 connected to an antenna arrangement 905. The antenna arrangement 905 may comprise a set of antennas. The number of antennas may be one to four, for example. The number of antennas is not limited to any particular number. The user equipment 804 may also comprise various other components, such as a user interface, camera, and media player. They are not displayed in the figure due to simplicity. The radio network node 801, 807, such as an LTE base station (eNode-B, eNB) or LTE-LAN access point (AP), comprises a controller 906 operationally connected to a memory 907, and a transceiver 908. The controller 906 controls the operation of the radio network node 801, 807. The memory 907 is configured to store software and data. The transceiver 908 is configured to set up and maintain a wireless connection to the user equipment 804 within the service area of the radio network node 801, 807. The transceiver 908 is operationally connected to an antenna arrangement 909. The antenna arrangement 909 may comprise a set of antennas. The number of antennas may be two to four, for example. The number of antennas is not limited to any particular number. The radio network node 801, 807 may be operationally connected (directly or indirectly) to another network element 803, 808 of the communication system, such as a radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server, via an interface 910. The network node 803, 808 comprises a controller 911 operationally connected to a memory 912, and an interface 913. The controller 911 controls the operation of the network node 803, 808. The memory 912 is configured to store software and data. The interface 913 is configured to connect to the radio network node 801, 807 via a connection 802, 809. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 801, 803, 807, 808 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 801, 803, 807, 808 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 902, 907, 912 may include volatile and/or non-volatile memory and typically stores content, data, or the like. For example, the memory 902, 907, 912 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 10:
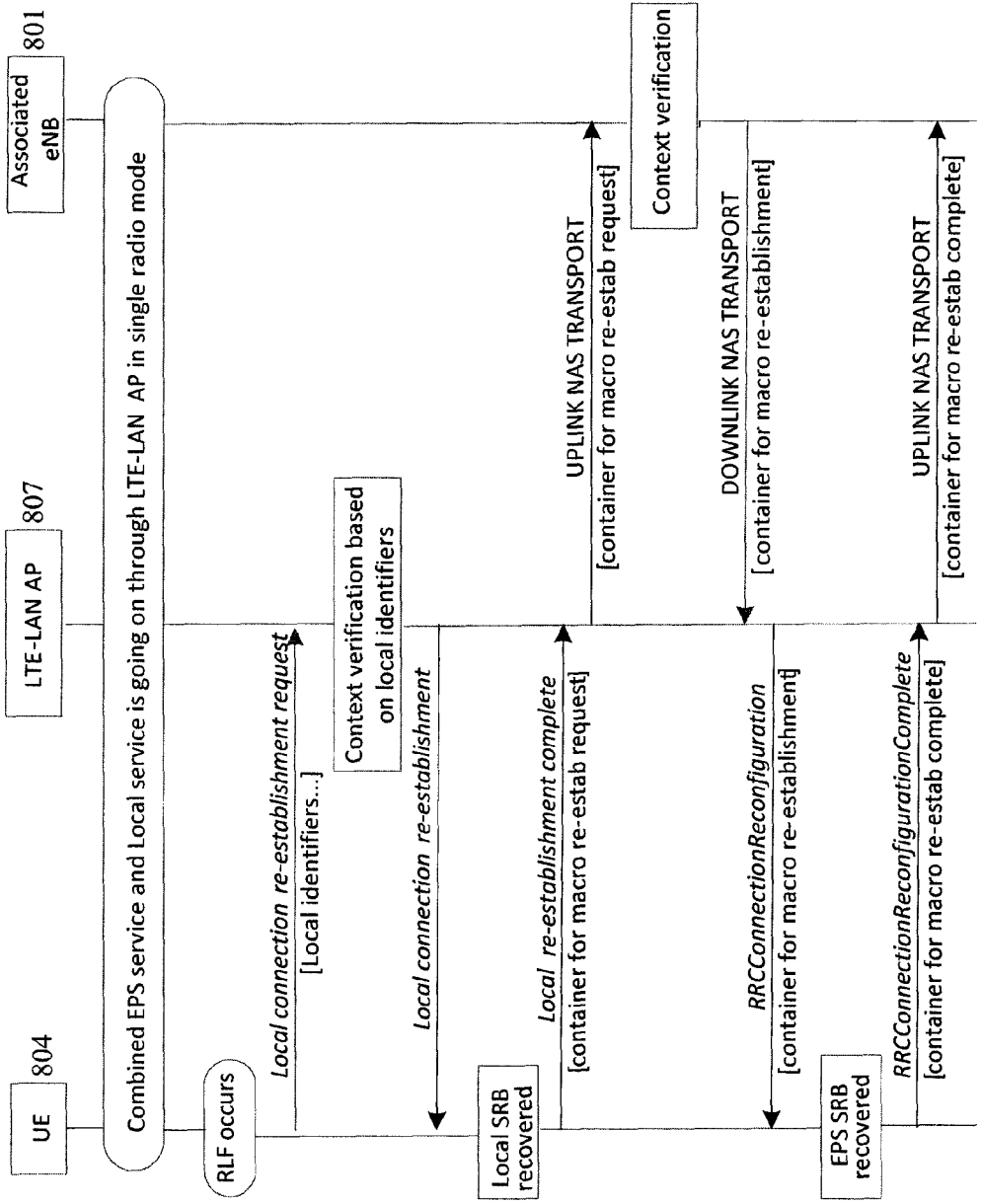
FIG. 10 shows a messaging diagram illustrating a method for recovering local SRB and SRB1 by means of re-establishment procedure according to an embodiment of the invention.

Embodiments illustrated in FIGS. 10 and 11 each propose a method for recovering connection for a UE that operated in a single radio mode through a LTE-LAN system for both offloaded EPS service and local IP service. To enable both local service and EPS service with different network control manners, LTE-LAN system needs to involve two RRC entities, i.e., one located in the LTE-LAN AP for local connection management and another one located in the associated eNB for EPS connection management.

The messaging chart of FIG. 10 illustrates signalling for recovering local SRB and SRB1 by means of re-establishment procedure(s).

In the example of FIG. 10, a network node 804 (which may comprise, e.g., a LTE-capable user equipment UE 804) is operating in a single radio mode in a local network comprising a local network apparatus 807 (which may comprise, e.g., LTE-LAN access point AP 807) so as to use both local IP service and offloaded EPS service. When RLF or HO failure happens, the UE 804 initiates local re-establishment request procedure by sending a local connection re-establishment request containing at least one local identifier of the user equipment to the LTE-LAN AP 807. Once the LTE-LAN AP 807 keeps and verifies local context, it will then facilitate the UE 804 to recover LTE-LAN connection and hereby local SRB is recovered. In a subsequent Local Reestablishment Complete message, the UE 804 includes a "NAS (Non-Access Stratum)-like" container for requesting macro re-establishment. This NAS-like container is not intended to be read by AP, but rather for AP to forward to an associated macro network apparatus, such as node 801 (which may comprise, e.g., a LTE-capable base station, i.e., eNode-B, also referred to as eNB) via the "simplified S1" interface. Once the associated macro network apparatus (e.g., eNB) 801 has verified the EPS context, it will send a macro re-establishment message also in the similar NAS-like container to the LTE-LAN AP 807. The messages for transferring these containers include, but are not limited to, existing Uplink/Downlink NAS Transport messages designed for S1 interface, and alternative dedicated messages also can be considered. The LTE-LAN AP 807 will then forward the macro re-establishment container to the UE 804 in the RRC Connection Reconfiguration message so as to recover EPS SRBs.

The messaging chart of FIG. 11 illustrates signalling for recovering local service and EPS service by means of service request procedure(s), in the cases where the above discussed re-establishment procedure might fail under some LTE-LAN AP due to lack of the UE context either because the current AP is a non-serving LTE-LAN AP or because the timer for maintaining UE context in the AP has expired.

Figure 11A:
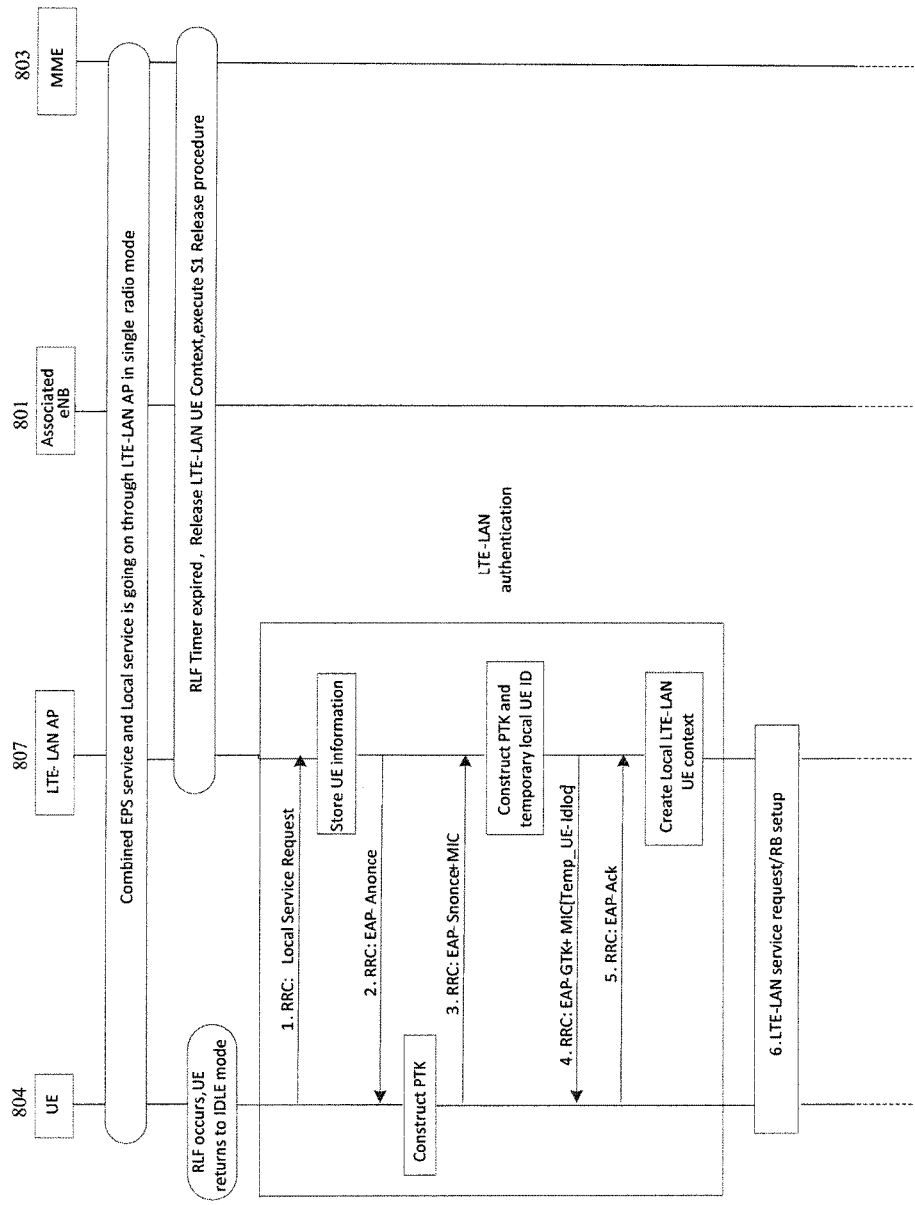
FIG. 11A shows a messaging diagram illustrating the first part of a method for recovering local service and EPS service by means of service request procedure according to an embodiment of the invention.

As shown in FIG. 11A, in the case of the UE 804 being previously involved in both local IP service and offloaded EPS service, upon a RLF or HO failure, the UE 804 skips over the re-establishment procedure (or even does not implement the re-establishment at all) by returning back to the IDLE mode. Then the service request procedure is triggered instead by sending a RRC Local Service Request to the LTE-LAN AP 807 from the UE 804. Subsequently, an authentication procedure is performed between the UE 804 and the LTE-LAN AP 807. This local authentication might be independent from the macro network if a third-party operator is deploying the LTE-LAN AP. Illustrated in FIG. 11A is an authentication procedure based on EAP method. However, the authentication method is not limited to EAP. Detailed description for the EPA method is omitted for simplicity, since it is well known to a person skilled in the art. After the local authentication, a local connection is established and a local service request can be issued by a LTE-LAN service request.

Figure 11B:
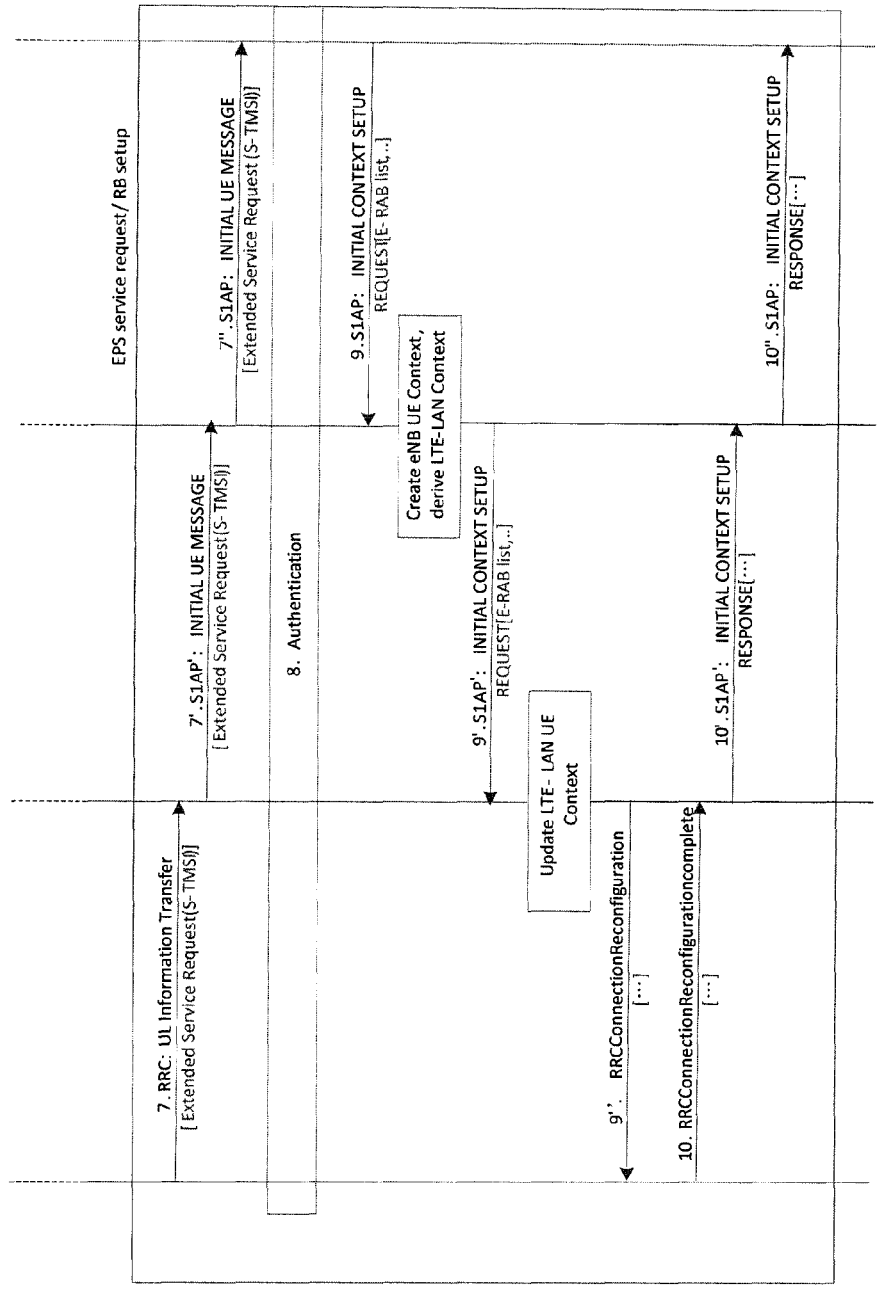
FIG. 11B shows a messaging diagram illustrating the second part of the method for recovering local service and EPS service by means of service request procedure according to the embodiment of the invention.

The proposed method continues in FIG. 11B, in which the UE 804 triggers an attaching procedure to the MME by sending to the LTE-LAN AP 807 a RRC UL Information Transfer message including Extended Service Request, which contains S-TMSI of the UE 804. Once the LTE-LAN AP 807 receives the message, it forwards the Extended Service Request in a S1AP' Initial UE Message via the simplified S1 interface to the associated eNB 801, wherein the S1AP' refers to the simplified S1 application protocol as mentioned above. Upon receipt of the Initial UE Message from the LTE-LAN 807, the eNB 801 sends to MME 803 a S1AP Initial UE Message including the received Extended Service Request, which contains the S-TMSI, via the legacy S1 interface. Thereafter, an authentication procedure between the UE 804 and the eNB 801 is performed. Once the UE is authenticated, the MME 803 sends a S1AP Initial Context Setup Request containing E-RAB list via the legacy S1 interface to the eNB 801. Upon receipt of the request, the eNB 801 creates eNB UE context and derives LTE-LAN context based on it. Subsequently, the eNB 801 sends a S1AP' Initial Context Setup Request containing the E-RAB list via the simplified S1 interface to the LTE-LAN AP 807. Later, the LTE-LAN AP 807 updates the LTE-LAN UE context according to the received Initial Context Setup Request. Subsequently, a RRC Connection Reconfiguration procedure is conducted between the LTE-LAN AP 807 and the UE 804, subsequent to which the LTE-LAN AP 807 sends a S1AP' Initial Context Setup Response via the simplified S1 interface to the eNB 801, and then the eNB 801 sends a S1AP Initial Context Setup Response to the MME 803 to inform the completion of the context setup procedure. At this point, it is possible to recover the EPS SRBs and issue EPS service request.

Figure 12:
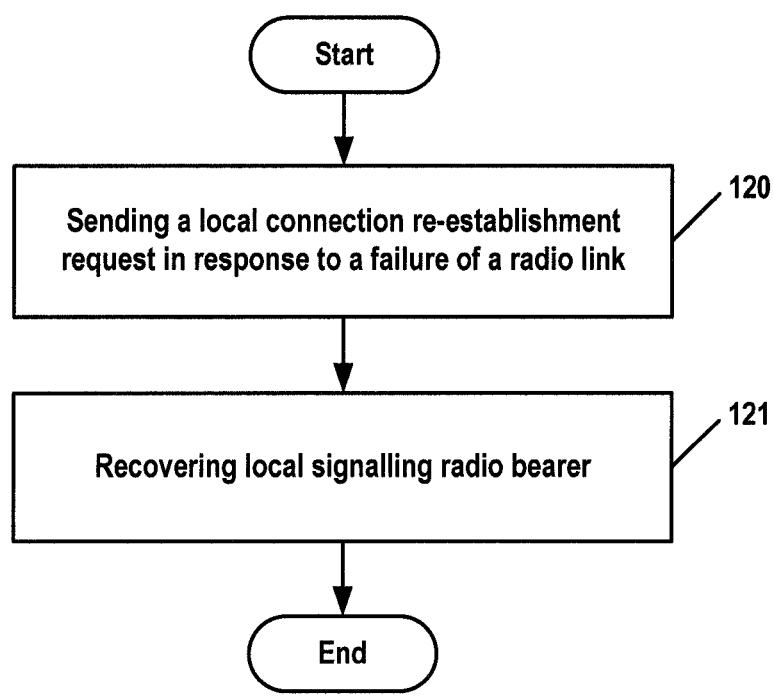
FIGS. 12-17 illustrate schematic diagrams of flow charts according to different embodiments of the invention.

FIG. 12 is a flow chart illustrating an embodiment. In block 120, an apparatus, which may comprise, e.g., a UE 804, sends a local connection re-establishment request to a local access apparatus, which may comprise, e.g., a LTE-LAN AP 807, in response to a failure of a radio link by which the apparatus 804 was connected to a local network and operated in a single radio mode to use bearer services provided by a macro network. Then the apparatus 804 recovers the local signalling radio bearer in response to successfully verifying, by the local access apparatus, local context of the apparatus 804 in block 121.

Figure 13:
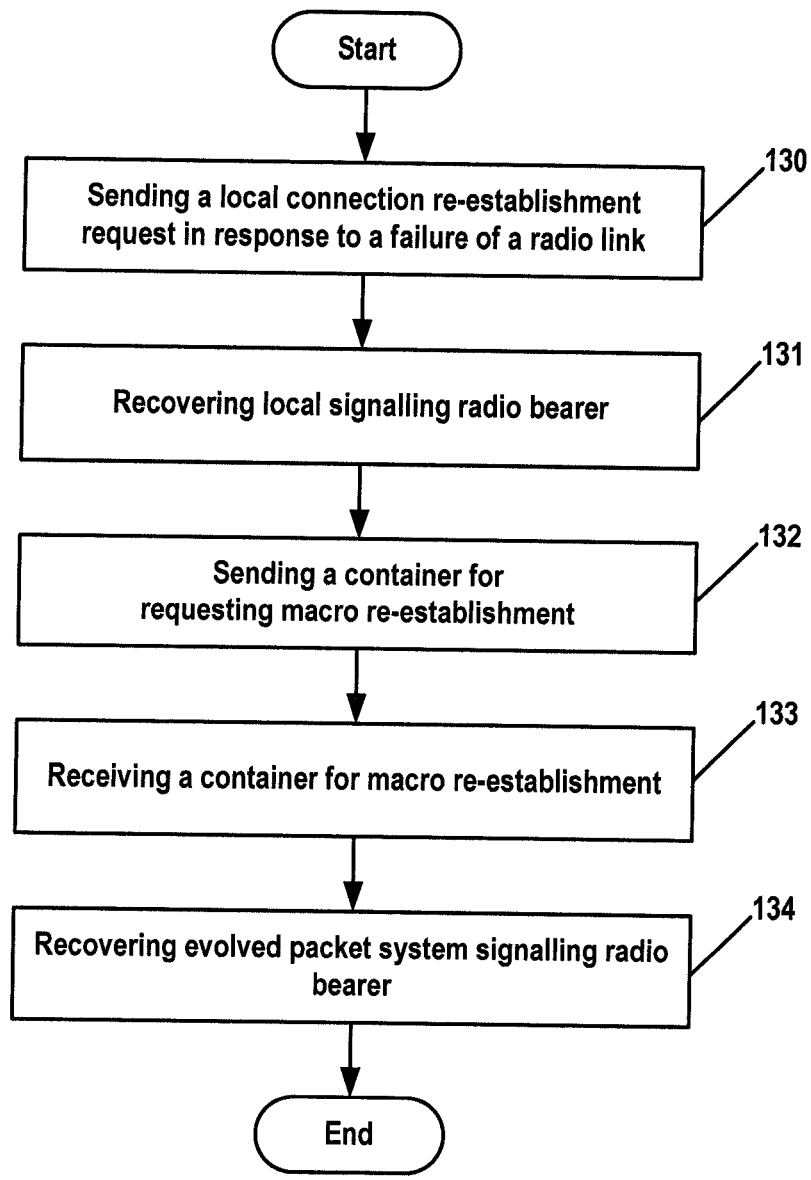

FIG. 13 is a flow chart illustrating an embodiment. In block 130, an apparatus, which may comprise, e.g., a UE 804, sends a local connection re-establishment request to a local access apparatus, which may comprise, e.g., a LTE-LAN AP 807, in response to a failure of a radio link by which the apparatus 804 was connected to a local network and operated in a single radio mode to use bearer services provided by a macro network. Then the apparatus 804 recovers the local signalling radio bearer in response to successfully verifying, by the local access apparatus, local context of the apparatus 804 in block 131. Once the local signaling radio bearer is recovered, the apparatus 804 sends to the local access apparatus 807 a local re-establishment complete message that comprises a container for requesting macro re-establishment in block 132, which may be forwarded by the local access apparatus to an associated macro network apparatus 801, which may comprise, e.g., a LTE-capable base station (eNode-B, eNB). Subsequently, after receiving in block 133, from the local access apparatus 807, a radio resource control connection reconfiguration message that comprises a container for macro re-establishment, which may be received by the local access apparatus from the associated macro network apparatus, the apparatus 804 recovers evolved packet system signalling radio bearer in block 134.

Figure 14:
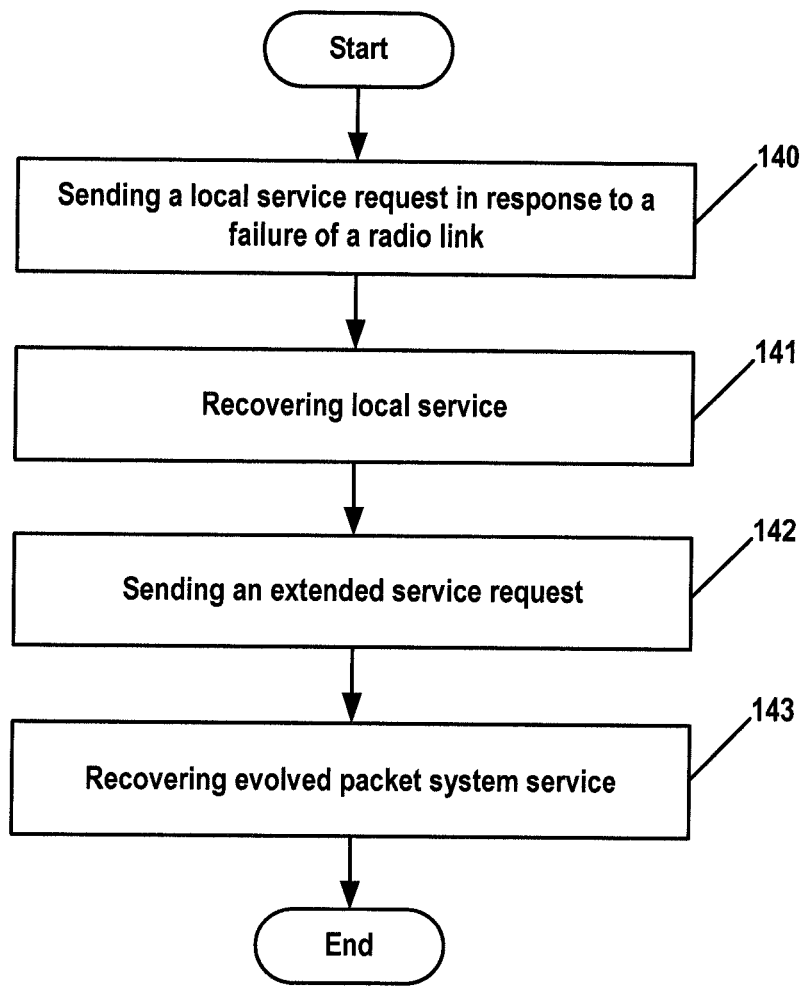

FIG. 14 is a flow chart illustrating an embodiment. In block 140, the apparatus, which may comprise, e.g., a UE 804, sends a local service request to a local access apparatus, which may comprise, e.g., a LTE-LAN AP 807, in response to a failure of a radio link by which the apparatus 804 was connected to a local network and operated in a single radio mode to use bearer services provided by a macro network. Then the local service for the apparatus 804 can be recovered in block 141 after the apparatus 804 is successfully authenticated by the local access apparatus 807. Afterwards, the apparatus 804 sends to the local access apparatus 807 an extended service request in block 142, which may be forwarded by the local access apparatus to an associated macro network apparatus 801, which may comprise, e.g., a LTE-capable base station (eNode-B, eNB), for recovering evolved packet system service. Then in block 143, the evolved packet system service can be recovered, after the associated macro network apparatus 801 authenticates the apparatus 804, creates macro context, and derives the local context for the apparatus 804.

Figure 15:
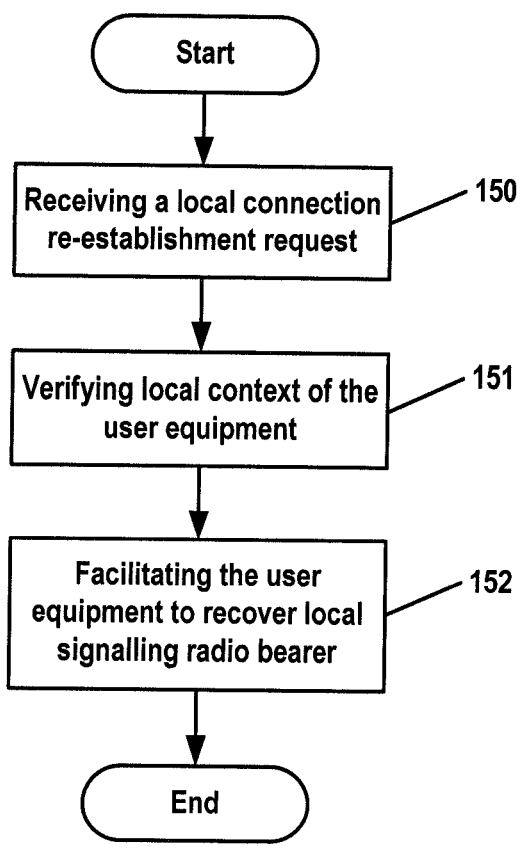

FIG. 15 is a flow chart illustrating an embodiment. In block 150, the local access apparatus 807, which may comprise, e.g., a LTE-LAN AP, receives a local connection re-establishment request from a network apparatus 804 that was connected to a local network and operated in a single radio mode to use bearer services provided by a macro network. The network apparatus 804 may comprise a user equipment. Then, the local access apparatus 807 verifies local context of the user equipment 804 in block 151. Once the local context is verified, the local access apparatus 807 can facilitate the user equipment 804 to recover local signalling bearer.

Figure 16:
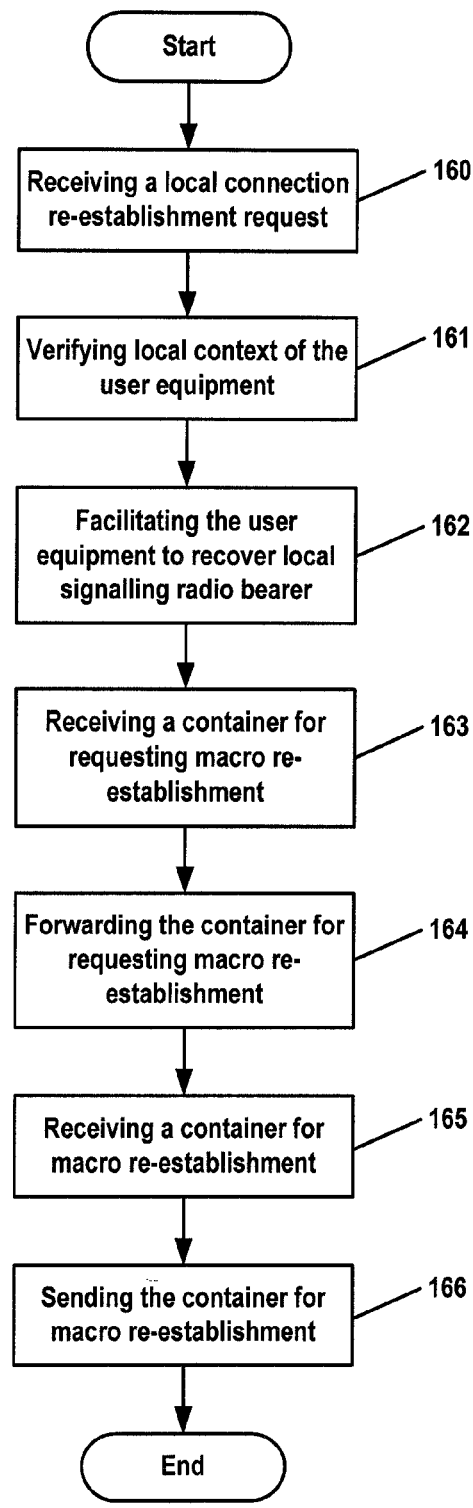

FIG. 16 is a flow chart illustrating an embodiment. In block 160, the local access apparatus 807, which may comprise, e.g., a LTE-LAN AP, receives a local connection re-establishment request from a network apparatus 804 that was connected to a local network and operated in a single radio mode to use bearer services provided by a macro network. The network apparatus 804 may comprise a user equipment. Then, the local access apparatus 807 verifies local context of the user equipment in block 161. Once the local context is verified, the local access apparatus 807 can facilitate the user equipment 804 to recover local signalling bearer. After the local signalling bearer is recovered, the local access apparatus 807 receives, in block 804, from the user equipment 804, a local re-establishment complete message that comprises a container for requesting macro re-establishment. Then the local access apparatus 807 forwards, in block 164, the container for requesting macro re-establishment to an associated macro network apparatus, which may comprise, e.g., a LTE-capable base station (eNode-B, eNB). Subsequently, subsequent to the local access apparatus 807 having received a container for macro re-establishment from the associated macro network apparatus 801 in block 165, the local access apparatus 807 sends to the user equipment 804 a radio resource control connection reconfiguration message that comprises the container for macro re-establishment, for recovering evolved packet system signalling radio bearer.

Figure 17:
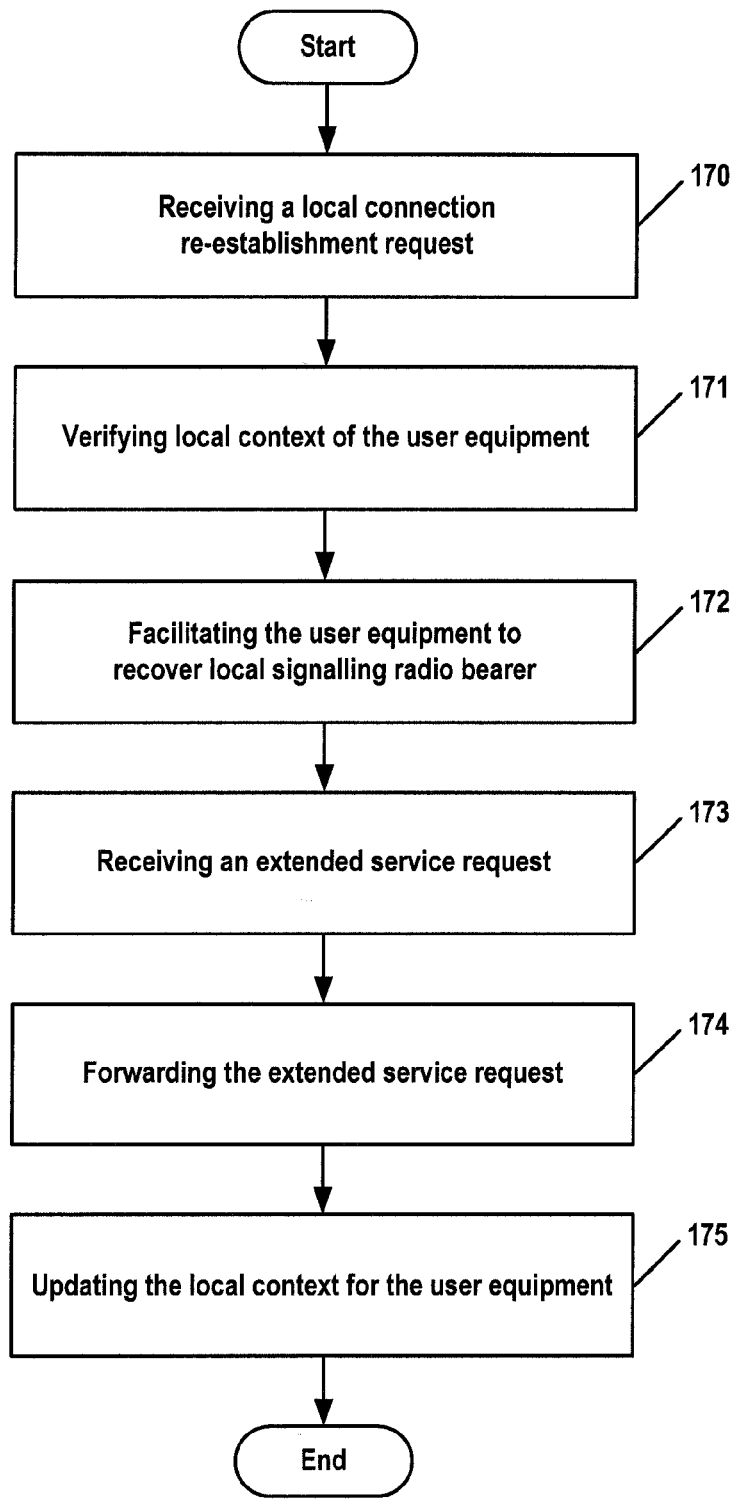

FIG. 17 is a flow chart illustrating an embodiment. In block 170, the local access apparatus 807, which may comprise, e.g., a LTE-LAN AP, receives a local connection re-establishment request from a network apparatus 804 that was connected to a local network and operated in a single radio mode to use bearer services provided by a macro network. The network apparatus 804 may comprise a user equipment. Then, the local access apparatus 807 verifies local context of the user equipment in block 171. Once the local context is verified, the local access apparatus 807 can facilitate the user equipment 804 to recover local signalling bearer. After the local signalling bearer is recovered, the local access apparatus 807 receives, in block 173, an extended service request sent by the user equipment 804 and then forwards it to an associated macro network apparatus 801, which may comprise, e.g., a LTE-capable base station (eNode-B, eNB) in block 174. Subsequently, after the associated macro network apparatus 801 authenticates the user equipment 804, creates macro context, and derives the local context for the user equipment 804, the local access apparatus 807 updates the local context for the user equipment 804 in block 175.

Thus, according to an embodiment, there is provided a method for sending a local connection re-establishment request to a local access apparatus, in response to a failure of a radio link by which a user equipment was connected to a local network and operated in a single radio mode to use bearer services provided by a macro network; and recovering local signalling radio bearer, in response to local context of the user equipment being successfully verified by the local access apparatus.

According to another embodiment, the local connection re-establishment request comprises at least one local identifier of the user equipment, based upon which the local context of the user equipment is verified by the local access apparatus.

According to yet another embodiment, there is provided a method for sending to the local access apparatus a local re-establishment complete message that comprises a container for requesting macro re-establishment, which may be forwarded by the local access apparatus to an associated macro network apparatus; and in response to receipt, from the local access apparatus, of a radio resource control connection reconfiguration message that comprises a container for macro re-establishment, which may be received by the local access apparatus from the associated macro network apparatus, recovering evolved packet system signalling radio bearer.

According to yet another embodiment, the container for requesting macro re-establishment and the container for macro re-establishment are transmitted through a simplified S1 interface between the local access apparatus and the associated macro network apparatus.

According to yet another embodiment, there is provided a method for sending to the local access apparatus a local service request for recovering local service for the user equipment, upon failure of recovering local signalling radio bearer.

According to yet another embodiment, there is provided a method for recovering local signalling radio bearer in response to the user equipment being successfully authenticated by the local access apparatus and local context being created for the user equipment by the local access apparatus.

According to yet another embodiment, there is provided a method for, upon successfully recovering local signalling radio bearer, sending to the local access apparatus an extended service request, which may be forwarded by the local access apparatus to the associated macro network apparatus, for recovering evolved packet system service for the user equipment.

According to yet another embodiment, there is provided a method for recovering evolved packet system signalling radio bearer in response to the user equipment being successfully authenticated by the associated macro network apparatus, macro context being created for the user equipment by the associated macro network apparatus, and the local context being updated for the user equipment by the local access apparatus.

According to yet another embodiment, there is provided a method for, upon failure of recovering evolved packet system signalling radio bearer, sending to the local access apparatus an extended service request, which may be forwarded by the local access apparatus to the associated macro network apparatus, for recovering evolved packet system service for the user equipment.

According to yet another embodiment, there is provided a method for recovering evolved packet system signalling radio bearer in response to the user equipment being successfully authenticated by the associated macro network apparatus, macro context being created for the user equipment by the associated macro network apparatus, and the local context being updated for the user equipment by the local access apparatus.

According to yet another embodiment, there is provided a method for attaching the user equipment to a mobility management entity prior to setting up evolved packet system radio bearers.

According to yet another embodiment, the local access apparatus is an LTE-LAN access point and the associated macro network apparatus is an LTE evolved node-B.

According to yet another embodiment, there is provided a program code means adapted to perform any of the method steps when the program is run on a computer.

According to yet another embodiment, there is provided a method for sending a local service request from a user equipment to a local access apparatus, in response to a failure of a radio link by which the user equipment was connected to a local network and operated in a single radio mode to use bearer services provided by a macro network; and recovering local signalling radio bearer.

According to yet another embodiment, there is provided a method for recovering local signalling radio bearer in response to the user equipment being successfully authenticated by the local access apparatus and local context being created for the user equipment by the local access apparatus.

According to yet another embodiment, there is provided a method for, upon successfully recovering local signalling radio bearer, sending to the local access apparatus an extended service request, which may be forwarded by the local access apparatus to an associated macro network apparatus, for recovering evolved packet system service for the user equipment.

According to yet another embodiment, there is provided a method for recovering evolved packet system signalling radio bearer in response to the user equipment being successfully authenticated by the associated macro network apparatus, macro context being created for the user equipment by the associated macro network apparatus, and the local context being updated for the user equipment by the local access apparatus.

According to yet another embodiment, there is provided a method for attaching the user equipment to a mobility management entity prior to setting up evolved packet system radio bearers.

According to yet another embodiment, the local access apparatus is an LTE-LAN access point and the associated macro network apparatus is an LTE evolved node-B.

According to yet another embodiment, there is provided a program code means adapted to perform any of the method steps when the program is run on a computer.

According to yet another embodiment, there is provided a method for receiving, at a local access apparatus, a local connection re-establishment request from a user equipment that was connected to a local network and operated in a single radio mode to use bearer services provided by a macro network; verifying local context of the user equipment; and facilitating the user equipment to recover local signalling radio bearer.

According to yet another embodiment, the local connection re-establishment request comprises at least one local identifier of the user equipment, based upon which the local context of the user equipment is verified by the local access apparatus.

According to yet another embodiment, there is provided a method for receiving, at the local access apparatus, a local re-establishment complete message that comprises a container for requesting macro re-establishment from the user equipment; forwarding the container for requesting macro re-establishment to an associated macro network apparatus; and in response to receipt, from the associated macro network apparatus, of a container for macro re-establishment at the local access apparatus, sending a radio resource control connection reconfiguration message that comprises the container for macro re-establishment to the user equipment for recovering evolved packet system signalling radio bearer.

According to yet another embodiment, the container for requesting macro re-establishment and the container for macro re-establishment are transmitted through a simplified S1 interface between the local access apparatus and the associated macro network apparatus.

According to yet another embodiment, there is provided a method for receiving, at the local access apparatus, a local service request sent by the user equipment in response to a failure of recovering local signalling radio bearer, for recovering the local service for the user equipment.

According to yet another embodiment, there is provided a method for authenticating the user equipment and creating local context for the user equipment by the local access apparatus.

According to yet another embodiment, there is provided a method for receiving, at the local access apparatus, an extended service request sent by the user equipment in response to successfully recovering local service for the user equipment; and forwarding the extended service request by the local access apparatus to the associated macro network apparatus, for recovering evolved packet system service for the user equipment.

According to yet another embodiment, there is provided a method for updating the local context for the user equipment by the local access apparatus in response to the user equipment being successfully authenticated by the associated macro network apparatus and macro context being created for the user equipment by the associated macro network apparatus.

According to yet another embodiment, there is provided a method for receiving, at the local access apparatus, an extended service request sent by the user equipment in response to a failure of recovering evolved packet system signalling radio bearer; forwarding the extended service request by the local access apparatus to the associated macro network apparatus, for recovering evolved packet system service for the user equipment.

According to yet another embodiment, there is provided a method for updating the local context for the user equipment by the local access apparatus in response to the user equipment being successfully authenticated by the associated macro network apparatus and macro context being created for the user equipment by the associated macro network apparatus.

According to yet another embodiment, there is provided a method for attaching the user equipment to a mobility management entity prior to setting up evolved packet system radio bearers.

According to yet another embodiment, the local access apparatus is an LTE-LAN access point and the associated macro network apparatus is an LTE evolved node-B.

According to yet another embodiment, there is provided a program code means adapted to perform any of the method steps when the program is run on a computer.

According to yet another embodiment, there is provided an apparatus comprising at least one processor; and at least one memory including a computer programme code, wherein the at least one memory and the computer program code are configured to, with the at least one processor, cause the apparatus to: in response to a failure of a radio link by which the apparatus was connected to a local network and operated in a single radio mode to use bearer services provided by a macro network, send a local connection re-establishment request to a local access apparatus; and in response to successfully verifying, by the local access apparatus, local context of the apparatus, recover local signalling radio bearer.

According to yet another embodiment, the local connection re-establishment request sent by the apparatus comprises at least one local identifier of the apparatus, based upon which the local context of the apparatus is verified by the local access apparatus.

According to yet another embodiment, the at least one memory and the computer program code are further configured to, with the at least one processor, cause the apparatus to: send to the local access apparatus a local re-establishment complete message that comprises a container for requesting macro re-establishment, which may be forwarded by the local access apparatus to an associated macro network apparatus; and in response to receipt, from the local access apparatus, of a radio resource control connection reconfiguration message that comprises a container for macro re-establishment, which may be received by the local access apparatus from the associated macro network apparatus, recover evolved packet system signalling radio bearer.

According to yet another embodiment, the at least one memory and the computer program code are further configured to, with the at least one processor, cause the apparatus to: upon failure of recovering local signalling radio bearer, send to the local access apparatus a local service request for recovering local service for the apparatus.

According to yet another embodiment, the at least one memory and the computer program code are further configured to, with the at least one processor, cause the apparatus to: upon successfully recovering local signalling radio bearer, send to the local access apparatus an extended service request, which may be forwarded by the local access apparatus to the associated macro network apparatus, for recovering evolved packet system service for the apparatus.

According to yet another embodiment, the at least one memory and the computer program code are further configured to, with the at least one processor, cause the apparatus to: upon failure of recovering evolved packet system signalling radio bearer, send to the local access apparatus an extended service request, which may be forwarded by the local access apparatus to the associated macro network apparatus, for recovering evolved packet system service for the apparatus.

According to yet another embodiment, the at least one memory and the computer program code are further configured to, with the at least one processor, cause the apparatus to initiate an attaching procedure to a mobility management entity prior to setting up evolved packet system radio bearers.

According to yet another embodiment, there is provided an apparatus comprising at least one processor; and at least one memory including a computer programme code, wherein the at least one memory and the computer program code are configured to, with the at least one processor, cause the apparatus to: in response to a failure of a radio link by which the apparatus was connected to a local network and operated in a single radio mode to use bearer services provided by a macro network, send a local service request to a local access apparatus; and recover local signalling radio bearer.

According to yet another embodiment, the at least one memory and the computer program code are further configured to, with the at least one processor, cause the apparatus to, upon successfully recovering local service for the apparatus, send to the local access apparatus an extended service request, which may be forwarded by the local access apparatus to an associated macro network apparatus, for recovering evolved packet system service for the apparatus.

According to yet another embodiment, the at least one memory and the computer program code are further configured to, with the at least one processor, cause the apparatus to initiate an attaching procedure to a mobility management entity prior to setting up evolved packet system radio bearers.

According to yet another embodiment, there is provided an apparatus comprising at least one processor; and at least one memory including a computer programme code, wherein the at least one memory and the computer program code are configured to, with the at least one processor, cause the apparatus to: receive a local connection re-establishment request from a user equipment that was connected to a local network and operated in a single radio mode to use bearer services provided by a macro network; verify local context of the user equipment; and facilitate the user equipment to recover local signalling radio bearer.

According to yet another embodiment, the at least one memory and the computer program code are further configured to, with the at least one processor, cause the apparatus to: receive a local re-establishment complete message that comprises a container for requesting macro re-establishment from the user equipment; forward the container for requesting macro re-establishment to an associated macro network apparatus; and in response to receipt, from the associated macro network apparatus, of a container for macro re-establishment, send a radio resource control connection reconfiguration message that comprises the container for macro re-establishment to the user equipment for recovering evolved packet system signalling radio bearer.

According to yet another embodiment, the at least one memory and the computer program code are further configured to, with the at least one processor, cause the apparatus to transmit the container for requesting macro re-establishment and receive the container for macro re-establishment through a simplified S1 interface between the apparatus and the associated macro network apparatus.

According to yet another embodiment, the at least one memory and the computer program code are further configured to, with the at least one processor, cause the apparatus to: receive a local service request sent by the user equipment, for recovering the local service for the user equipment; authenticate the user equipment; and create local context for the user equipment.

According to yet another embodiment, the at least one memory and the computer program code are further configured to, with the at least one processor, cause the apparatus to: receive an extended service request sent by the user equipment; forward the extended service request to the associated macro network apparatus.

According to yet another embodiment, the at least one memory and the computer program code are further configured to, with the at least one processor, cause the apparatus to: receive an initial context setup request sent by the associated macro network apparatus; and update the local context for the user equipment.

According to yet another embodiment, the at least one memory and the computer program code are further configured to, with the at least one processor, cause the apparatus to transmit the extended service request and receive the initial context setup request through the simplified S1 interface between the apparatus and the associated macro network apparatus.

According to yet another embodiment, the apparatus is an LTE-LAN access point.

Embodiments of the present invention may have below and other advantages: both local area SRB and macro SRB1 may be recovered together in the case that an UE with both local IP service and offloaded EPS service experiences RLF; thus, better user experience may be achieved.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

3GPP 3rd generation partnership project
AP access point
AS access stratum
BS base station
CA carrier aggregation
CN core network
C-plane control plane
C-RNTI cell radio network temporary identifier
DL downlink
DRB data radio bearer
EAP extensible authentication protocol
eNB enhanced node-B
EPC evolved packet core
EPS evolved packet system
E-RAB enhanced radio access bearer
EUTRAN evolved UMTS terrestrial radio access network
GPRS general packet radio service
HeNB home enhanced node-B
HO handover
HSPA high speed packet access
HSS home subscriber server
HW hardware
ICCID integrated circuit card identifier
ICT information and communication technology
ID identity
IMEI international mobile equipment identity
IMSI international mobile subscriber identity
I-RAT inter radio access technology
LTE long term evolution
LAN local area network
LAE local area evolution
LIPA local IP access
MAC medium access control
MME mobility management entity
NAI network access identifier
NAS non-access stratum
PCI physical cell identity
PLMN public land mobile network
QoS quality of service
RADIUS remote authentication dial-in user service
RAN radio access network
RAT radio access technology
RLF radio link failure
RRC radio resource control
SAE system architecture evolution
SGSN serving GPRS support node
S-GW serving gateway
SIM subscriber identity module
SN support node
SRB signalling radio bearer
S-TMSI SAE temporary mobile subscriber identity
TAI international atomic time
UE user equipment
UICC universal integrated circuit card
U-plane user plane
Wi-Fi wireless fidelity
WLAN wireless local area network
UMTS universal mobile telecommunications system

What is claimed is:

1. A method comprising:
   receiving, by a user equipment operating in a single radio mode, data carried by a local connection through a local area network and carried by a connection through a radio link to a macro network, the macro network providing, at the connection, a user bearer service to the user equipment;
   sending, by the user equipment and in response to a failure of the radio link, a local connection re-establishment request to a local access apparatus of the local area network;
   determining, by the user equipment, that the local connection has been re-established; and
   sending, by the user equipment, a message to the local access apparatus for requesting re-establishment of the connection to the macro network, in response to the local connection being successfully re-established.

2. The method according to claim 1, wherein the local connection re-establishment request comprises at least one local identifier of the user equipment, based upon which a local context of the user equipment can be verified by the local access apparatus.

3. The method according to claim 1, further comprising:
   sending the message to the local access apparatus as a local re-establishment complete message that comprises a container for requesting macro re-establishment, which may be forwarded by the local access apparatus to an associated macro network apparatus; and
   recovering an evolved packet system signalling radio bearer in response to receipt, from the local access apparatus, of a radio resource control connection reconfiguration message that comprises a container for macro re-establishment.

4. The method according to claim 1, further comprising:
   sending, to the local access apparatus and upon failure of recovering local signalling radio bearer, a local service request for recovering local service for the user equipment.

5. The method according to claim 1, further comprising:
   sending, upon successfully recovering a local signalling radio bearer, the message to the local access apparatus as an extended service request, for the local access apparatus to forward to an associated macro network apparatus, for recovering evolved packet system service for the user equipment.

6. The method according to claim 5, further comprising:
   recovering an evolved packet system signalling radio bearer through:

authenticating the user equipment through the associated macro network apparatus,
creating a macro context for the user equipment through the associated macro network apparatus, and
updating a local context for the user equipment through the local access apparatus.

7. The method according to claim 1, further comprising:
sending, upon failure of recovering an evolved packet system signalling radio bearer, an extended service request to the local access apparatus, for forwarding by the local access apparatus to an associated macro network apparatus, for recovering evolved packet system service for the user equipment.

8. The method according to claim 7, further comprising:
recovering evolved packet system signalling radio bearer through:
authenticating the user equipment through the associated macro network apparatus,
creating a macro context for the user equipment through the associated macro network apparatus, and
updating a local context for the user equipment through the local access apparatus.

9. An apparatus comprising:
at least one processor; and
at least one memory including a computer program code, wherein the at least one memory and the computer program code are configured to, with the at least one processor, cause the apparatus to at least:
receive, at the apparatus operating in a single radio mode, data carried by a local connection through a local area network and carried by a connection through a radio link to a macro network, the macro network providing, at the connection, a user bearer service to the apparatus;
send, in response to a failure of the radio link, a local connection re-establishment request to a local access apparatus of the local area network;
determine that the local connection has been re-established; and
send a message to the local access apparatus for requesting re-establishment of the connection to the macro network, in response to the local connection being successfully re-established.

10. The apparatus according to claim 9, wherein the local connection re-establishment request sent by the apparatus comprises at least one local identifier of the apparatus, based upon which a local context of the apparatus can be verified by the local access apparatus.

11. The apparatus according to claim 9, wherein the at least one memory and the computer program code are further configured to, with the at least one processor, cause the apparatus to at least:
send the message to the local access apparatus as a local re-establishment complete message that comprises a container for requesting macro re-establishment, which may be forwarded by the local access apparatus to an associated macro network apparatus; and
recover an evolved packet system signalling radio bearer in response to receipt, from the local access apparatus, of a radio resource control connection reconfiguration message that comprises a container for macro re-establishment.

12. The apparatus according to claim 9, wherein the at least one memory and the computer program code are further configured to, with the at least one processor, cause the apparatus to at least:
send, to the local access apparatus and upon failure of recovering local signalling radio bearer, a local service request for recovering local service for the apparatus.

13. The apparatus according to claim 9, wherein the at least one memory and the computer program code are further configured to, with the at least one processor, cause the apparatus to at least:
send, upon successfully recovering a local signalling radio bearer, the message to the local access apparatus as an extended service request, for the local access apparatus to forward to an associated macro network apparatus, for recovering evolved packet system service for the apparatus.

14. The apparatus according to claim 9, wherein the at least one memory and the computer program code are further configured to, with the at least one processor, cause the apparatus to at least:
send, upon failure of recovering an evolved packet system signalling radio bearer, an extended service request to the local access apparatus, for forwarding by the local access apparatus to an associated macro network apparatus, for recovering evolved packet system service for the apparatus.

15. The apparatus according to claim 14, wherein the at least one memory and the computer program code are further configured to, with the at least one processor, cause the apparatus to at least:
initiate an attaching procedure to a mobility management entity prior to setting up evolved packet system radio bearers.

16. An apparatus comprising:
at least one processor; and
at least one memory including a computer program code, wherein the at least one memory and the computer program code are configured to, with the at least one processor, cause the apparatus to at least:
transmit, to a user equipment operating in a single radio mode, data carried by a local connection through a local area network and carried by a connection through a radio link to a macro network, the macro network providing, at the connection, a user bearer service to the user equipment;
receive a local connection re-establishment request from the user equipment;
verify, in response to receiving the local connection re-establishment request, a local context of the user equipment; and
receive, from the user equipment, a message for requesting re-establishment of the connection to the macro network.

17. The apparatus according to claim 16, wherein the at least one memory and the computer program code are further configured to, with the at least one processor, cause the apparatus to at least:
receive the message as a local re-establishment complete message that comprises a container for requesting macro re-establishment;
forward the container for requesting macro re-establishment to an associated macro network apparatus; and
send, in response to receipt of a container for macro re-establishment from the associated macro network apparatus, a radio resource control connection reconfiguration message that comprises the container for macro re-establishment to the user equipment for recovering evolved packet system signalling radio bearer.

18. The apparatus according to claim 16, wherein the at least one memory and the computer program code are further configured to, with the at least one processor, cause the apparatus to at least:
  receive a local service request sent by the user equipment, for recovering the local service for the user equipment;
  authenticate the user equipment; and
  create local context for the user equipment.

19. The apparatus according to claim 16, wherein the at least one memory and the computer program code are further configured to, with the at least one processor, cause the apparatus to at least:
  receive an extended service request sent by the user equipment, for recovering the extended service for the user equipment;
  forward the extended service request to an associated macro network apparatus.

20. The apparatus according to claim 19, wherein the at least one memory and the computer program code are further configured to, with the at least one processor, cause the apparatus to at least:
  receive an initial context setup request sent by the associated macro network apparatus; and
  update the local context for the user equipment.

\* \* \* \* \*